US008284206B2

(12) United States Patent
State et al.

(10) Patent No.: US 8,284,206 B2
(45) Date of Patent: Oct. 9, 2012

(54) GENERAL PURPOSE SOFTWARE PARALLEL TASK ENGINE

(75) Inventors: Gavriel State, Ottawa (CA); Nicolas Capens, Sint-Niklaas (BE); Luther Johnson, Cambridge, MA (US)

(73) Assignee: Transgaming, Inc., Toronto (CA)

( * ) Notice: Subject to any disclaimer, the term of this patent is extended or adjusted under 35 U.S.C. 154(b) by 1552 days.

(21) Appl. No.: 11/686,114

(22) Filed: Mar. 14, 2007

(65) Prior Publication Data
US 2007/0220525 A1   Sep. 20, 2007

Related U.S. Application Data

(60) Provisional application No. 60/781,961, filed on Mar. 14, 2006.

(51) Int. Cl.
*G06F 15/16* (2006.01)
*G06F 15/80* (2006.01)

(52) U.S. Cl. ........................... 345/505; 345/502

(58) Field of Classification Search ........... 345/502–505
See application file for complete search history.

(56) References Cited

U.S. PATENT DOCUMENTS

| 5,202,987 | A | 4/1993 | Bayer et al. | |
|---|---|---|---|---|
| 6,434,590 | B1 * | 8/2002 | Blelloch et al. | 718/102 |
| 6,480,876 | B2 | 11/2002 | Rehg et al. | |
| 7,522,168 | B2 * | 4/2009 | Stenson et al. | 345/505 |
| 7,587,437 | B2 * | 9/2009 | Orii | 708/200 |
| 7,633,506 | B1 * | 12/2009 | Leather et al. | 345/506 |
| 7,747,842 | B1 * | 6/2010 | Goudy et al. | 712/220 |

FOREIGN PATENT DOCUMENTS
EP   1 569 104   5/2006
WO   WO 2005/006153   1/2005

OTHER PUBLICATIONS

European Search Report issued in European Patent Application No. 07 71 0745, mailed Feb. 5, 2010.
T.W. Crockett, "An Introduction to Parallel Rendering", Parallel Computing Elsevier Netherlands, vol. 23, No. 7 pp. 819-843 (Jul. 1997), XP002563856.
Niklas Folkegard et al., "Dynamic Code Generation for Realtime Shaders", SIGRAD 2004 (online), pp. 11-15 (Nov. 24, 2004), XP002563857.
T.W. Crockett, "Design Considerations for Parallel Graphics Libraries" (Online) (1994); XP002563858, http://reference.kfupm.edu.sa/content/d/e/design_considerations_for_parallell_graph_126807.pdf.
Klette, Reinhard. "The m-Dimensionai Grid Point Space," Computer Vision Graphics Image Processing, vol. 30, pp. 1-12, 1985.
Written opinion for PCT/CA2007/000415 mailing date of May 31, 2007.
International Search Report for PCT/CA2007/000415 mailing date of May 31, 2007.

* cited by examiner

*Primary Examiner* — Hau Nguyen
(74) *Attorney, Agent, or Firm* — DLA Piper LLP US

(57) ABSTRACT

A software engine for decomposing work to be done into tasks, and distributing the tasks to multiple, independent CPUs for execution is described. The engine utilizes dynamic code generation, with run-time specialization of variables, to achieve high performance. Problems are decomposed according to methods that enhance parallel CPU operation, and provide better opportunities for specialization and optimization of dynamically generated code. A specific application of this engine, a software three dimensional (3D) graphical image renderer, is described.

37 Claims, 17 Drawing Sheets

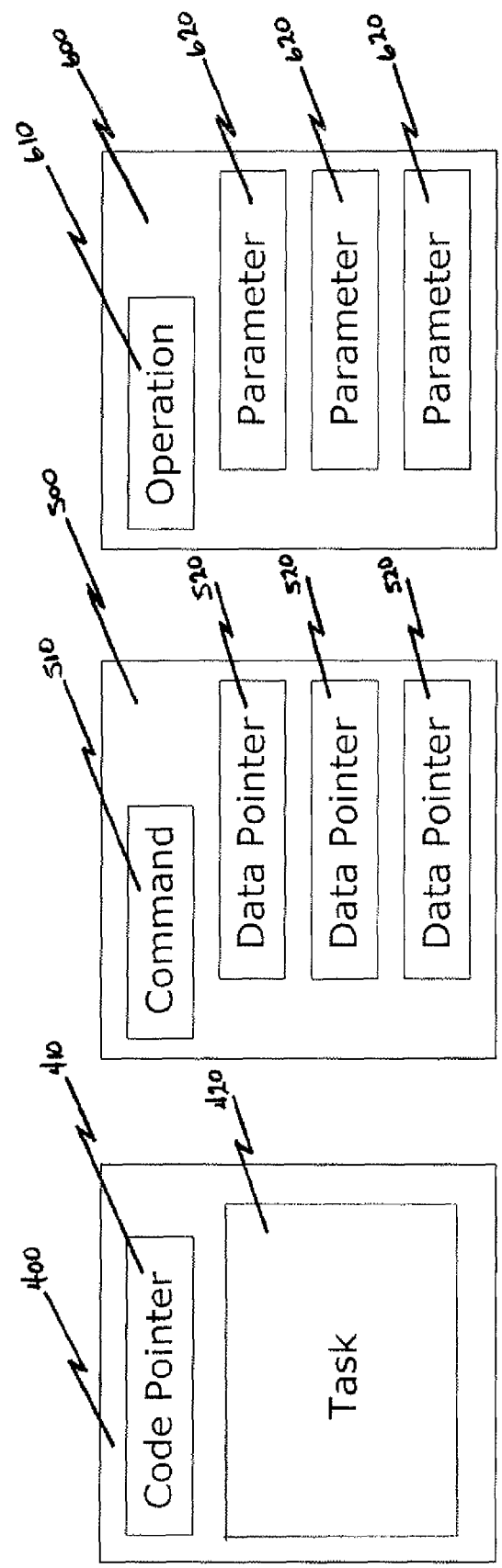

```
; Perform 4x4 matrix by 4x1 vector multiply
; All matrix/vector elements DP (64 bit) FP numbers
; Matrix rows and row and vector elements numbered 0-3
; Vector elements 0,1,2,3 are denoted x,y,z,w ; Pointer to input vectors in ESI (AoS)
; Pointer to output vectors in EDI (AoS)
; Starting offset in EAX
; Offset mask in EDX
; Pointer to matrix (rows) in EBX
; Number of vectors to process in ECX ; Compute one output vector per iteration mvmpy:

mvloop:

; Compute output x, y elements, first two row-vector dot products movupd  xmm4,[ebx+0]             ; 0, 1 elements of row 0
        movupd  xmm5,[ebx+16]            ; 2, 3 elements of row 0
        movupd  xmm6,[ebx+32]            ; 0, 1 elements of row 1
        movupd  xmm7,[ebx+48]            ; 2, 3 elements of row 1 movupd  xmm0,[esi+eax+0]         ; x, y
        movupd  xmm1,[esi+eax+16]        ; z, w
        movupd  xmm2,xmm0
        movupd  xmm3,xmm1                ; copies mulpd   xmm0,xmm4                ; xmm0: (a, b): row0[0]*x, row0[1]*y
        mulpd   xmm1,xmm5                ; xmm1: (c, d): row0[2]*z, row0[3]*w
        mulpd   xmm2,xmm6                ; xmm2: (e, f): row1[0]*x, row1[1]*y
        mulpd   xmm3,xmm7                ; xmm3: (g, h): row1[2]*z, row1[3]*w haddpd  xmm0,xmm1                ; xmm0: (a+b, c+d)
        haddpd  xmm2,xmm3                ; xmm2: (e+f, g+h)
        haddpd  xmm0,xmm2                ; xmm0: (a+b+c+d, e+f+g+h)

movupd  [edi+eax+0],xmm0         ; (x, y)

; Compute output z, w elements, last two row-vector dot products movupd  xmm4,[ebx+64]            ; 0, 1 elements of row 2
        movupd  xmm5,[ebx+80]            ; 2, 3 elements of row 2
        movupd  xmm6,[ebx+96]            ; 0, 1 elements of row 3
        movupd  xmm7,[ebx+112]           ; 2, 3 elements of row 3 movupd  xmm0,[esi+eax+0]         ; x, y
        movupd  xmm1,[esi+eax+16]        ; z, w
        movupd  xmm2,xmm0
        movupd  xmm3,xmm1                ; copies mulpd   xmm0,xmm4                ; xmm0: (a, b): row2[0]*x, row2[1]*y
        mulpd   xmm1,xmm5                ; xmm1: (c, d): row2[2]*z, row2[3]*w
        mulpd   xmm2,xmm6                ; xmm2: (e, f): row3[0]*x, row3[1]*y
        mulpd   xmm3,xmm7                ; xmm3: (g, h): row3[2]*z, row3[3]*w haddpd  xmm0,xmm1                ; xmm0: (a+b, c+d)
        haddpd  xmm2,xmm3                ; xmm2: (e+f, g+h)
        haddpd  xmm0,xmm2                ; xmm0: (a+b+c+d, e+f+g+h)

movupd  [edi+eax+16],xmm0        ; (z, w)

; Update pointers and count, loop or return add     eax,32
        and     eax,edx
        loop    mvloop
        ret ; 32 instructions, 12 memory reads, 2 memory writes, per vector per CPU
; 2 CPUs: 16 instructions, 6 memory reads, 1 memory write, per vector
; 4 CPUs: 8 instructions, 3 memory reads, .5 memory write per vector
```

Figure 10. Full-datum Matrix-vector Multiplication with SSE3 Instructions

; Perform 4x4 matrix by 4x1 vector multiply
; All matrix/vector elements DP (64 bit) FP numbers
; Matrix rows and row and vector elements numbered 0-3
; Vector elements 0,1,2,3 are denoted x,y,z,w ; Pointer to input vectors in ESI (AoS)
; Pointer to output vectors in EDI (AoS)
; Starting offset in EAX
; Offset mask in EDX
; Pointer to matrix (rows) in EBX
; Number of vectors to process in ECX ; Compute x, y elements of one vector per iteration mvmpy:

; Load requisite matrix rows ahead of loop

```
        movupd   xmm4,[ebx+0]           ; 0, 1 elements of row 0
        movupd   xmm5,[ebx+16]          ; 2, 3 elements of row 0
        movupd   xmm6,[ebx+32]          ; 0, 1 elements of row 1
        movupd   xmm7,[ebx+48]          ; 2, 3 elements of row 1
``` mvloop:

; Compute output x, y elements, first two row-vector dot products

```
        movupd   xmm0,[esi+eax+0]       ; x, y
        movupd   xmm1,[esi+eax+16]      ; z, w
        movupd   xmm2,xmm0
        movupd   xmm3,xmm1              ; copies mulpd    xmm0,xmm4              ; xmm0: (a, b): row0[0]*x, row0[1]*y
        mulpd    xmm1,xmm5              ; xmm1: (c, d): row0[2]*z, row0[3]*w
        mulpd    xmm2,xmm6              ; xmm2: (e, f): row1[0]*x, row1[1]*y
        mulpd    xmm3,xmm7              ; xmm3: (g, h): row1[2]*z, row1[3]*w haddpd   xmm0,xmm1              ; xmm0: (a+b, c+d)
        haddpd   xmm2,xmm3              ; xmm2: (e+f, g+h)
        haddpd   xmm0,xmm2              ; xmm0: (a+b+c+d, e+f+g+h)

movupd   [edi+eax+0],xmm0       ; (x, y)
```

; Update pointers and count, loop or return

```
        add      eax,32
        and      eax,edx
        loop     mvloop
        ret
```

; 12 instructions, 2 memory reads, 1 memory write, per half-vector per CPU
; 2 CPUs: 12 instructions, 2 memory reads, 1 memory write per vector
; 4 CPUs: 6 instructions, 1 memory read, .5 memory write per vector Figure 11. Half-datum Matrix-vector Multiplication with SSE3 Instructions

```
; Perform 4x4 matrix by 4x1 vector multiply
; All matrix/vector elements DP (64 bit) FP numbers
; Matrix rows and row and vector elements numbered 0-3
; Vector elements 0,1,2,3 are denoted x,y,z,w ; Pointer to input vectors in ESI (AoS)
; Pointer to output vectors in EDI (AoS)
; Starting offset in EAX
; Offset mask in EDX
; Pointer to matrix (rows) in EBX
; Number of vectors to process in ECX ; Compute x, y elements of one vector per iteration ; Specialize with knowledge that only element 1 of row 0,
; and element 2 of row 1, are nonzero mvmpy:

; Load requisite matrix rows ahead of loop movupd   xmm4,[ebx+0]              ; 0, 1 elements of row 0

; These two half-rows are all zero
;       movupd   xmm5,[ebx+16]             ; 2, 3 elements of row 0
;       movupd   xmm6,[ebx+32]             ; 0, 1 elements of row 1 movupd   xmm7,[ebx+48]             ; 2, 3 elements of row 1 mvloop:

; Compute output x, y elements, first two row-vector dot products movupd   xmm0,[esi+eax+0]          ; x, y
        movupd   xmm1,[esi+eax+16]         ; z, w ; These copies are no longer necessary
;       movupd   xmm2,xmm0
;       movupd   xmm3,xmm1                 ; copies mulpd    xmm0,xmm4                 ; xmm0: (a, b): row0[0]*x, row0[1]*y ; These two products are all zero
;       mulpd    xmm1,xmm5                 ; xmm1: (c, d): row0[2]*z, row0[3]*w
;       mulpd    xmm2,xmm6                 ; xmm2: (e, f): row1[0]*x, row1[1]*y ; This instruction can now use xmm1, it is no longer destroyed
;       mulpd    xmm3,xmm7                 ; xmm3: (g, h): row1[2]*z, row1[3]*w
        mulpd    xmm1,xmm7                 ; xmm1: (g, h): row1[2]*z, row1[3]*w ; These three instructions can be simplified - only products b and g are nonzero
;       haddpd   xmm0,xmm1                 ; xmm0: (a+b, c+d)
;       haddpd   xmm2,xmm3                 ; xmm2: (e+f, g+h)
;       haddpd   xmm0,xmm2                 ; xmm0: (a+b+c+d, e+f+g+h)

addpd    xmm1,xmm0                 ; xmm1: (g, b)
        shufpd   xmm0,xmm1,1               ; xmm0: (b, g)

movupd   [edi+eax+0],xmm0          ; (x, y)

; Update pointers and count, loop or return add    eax,32
        and    eax,edx
        loop   mvloop
        ret ; 7 instructions, 2 memory reads, 1 memory write, per half-vector per CPU
; 2 CPUs: 6 instructions, 2 memory reads, 1 memory write per vector
; 4 CPUs: 3 instructions, 1 memory read, .5 memory write per vector
```

Figure 12. Specialized Half-datum Matrix-vector Multiplication with SSE3 Instructions

```
; Perform 4x4 matrix by 4x1 vector multiply
; All matrix/vector elements DP (64 bit) FP numbers
; Matrix rows and row and vector elements numbered 0-3
; Vector elements 0,1,2,3 are denoted x,y,z,w ; Pointer to input vectors in ESI (AoS)
; Pointer to output vectors in EDI (AoS)
; Starting offset in EAX
; Offset mask in EDX
; Pointer to matrix (rows) in EBX
; Number of vectors to process in ECX ; Compute x, y elements of one vector per iteration ; Specialize with knowledge that only element 1 of row 0,
; and element 2 of row 1, are nonzero mvmpy:

; Load requisite matrix rows ahead of loop movupd  xmm6,[ebx+0]         ; 0, 1 elements of row 0
        movupd  xmm7,[ebx+48]        ; 2, 3 elements of row 1
        addpd   xmm6,xmm7            ; row1[2], row0[1]
        shufpd  xmm7,xmm6,1          ; row0[1], row1[2]

mvloop:

; Compute output x, y elements, first two row-vector dot products movupd  xmm0,[esi+eax+8]     ; y, z
        mulpd   xmm0,xmm7            ; xmm0: row0[1]*y, row1[2]*z
        movupd  [edi+eax+0],xmm0     ; (x, y)

; Update pointers and count, loop or return add     eax,32
        and     eax,edx
        loop    mvloop
        ret ; 3 instructions, 1 memory reads, 1 memory write, per half-vector per CPU
; 2 CPUs: 3 instructions, 1 memory reads, 1 memory write per vector
; 4 CPUs: 1.5 instructions, .5 memory read, .5 memory write per vector
```

Figure 13. Optimal Half-datum Specialized Matrix-vector Multiplication with SSE2 Instructions

```
; Perform 4x4 matrix by 4x1 vector multiply
; All matrix/vector elements DP (64 bit) FP numbers
; Matrix rows and row and vector elements numbered 0-3
; Vector elements 0,1,2,3 are denoted x,y,z,w ; Pointer to input vectors in ESI (AoS)
; Pointer to output vectors in EDI (AoS)
; Starting offset in EAX
; Offset mask in EDX
; Pointer to matrix (rows) in EBX
; Number of vectors to process in ECX ; Compute x, y elements of four vectors per iteration ; Specialize with knowledge that only element 1 of row 0,
; and element 2 of row 1, are nonzero mvmpy:

; Load requisite matrix rows ahead of loop movupd   xmm6,[ebx+0]            ; 0, 1 elements of row 0
        movupd   xmm7,[ebx+48]           ; 2, 3 elements of row 1
        addpd    xmm6,xmm7               ; row1[2], row0[1]
        shufpd   xmm7,xmm6,1             ; row0[1], row1[2]

mvloop:

; Compute output x, y elements, from first two row-vector dot products movupd   xmm0,[esi+eax+8]        ; y0, z0
        movupd   xmm1,[esi+eax+40]       ; y1, z1
        movupd   xmm2,[esi+eax+72]       ; y2, z2
        movupd   xmm3,[esi+eax+104]      ; y3, z3 mulpd    xmm0,xmm7               ; xmm0: row0[1]*y0, row1[2]*z0
        mulpd    xmm1,xmm7               ; xmm1: row0[1]*y1, row1[2]*z1
        mulpd    xmm2,xmm7               ; xmm2: row0[1]*y2, row1[2]*z2
        mulpd    xmm3,xmm7               ; xmm3: row0[1]*y3, row1[2]*z3 movupd   [edi+eax+0],xmm0        ; (x0, y0)
        movupd   [edi+eax+32],xmm1       ; (x1, y1)
        movupd   [edi+eax+64],xmm2       ; (x2, y2)
        movupd   [edi+eax+96],xmm3       ; (x3, y3)

; Update pointers and count, loop or return add      eax,128
        and      eax,edx
        loop     mvloop
        ret ; 12 instructions, 4 memory reads, 4 memory writes, per four half-vectors per CPU
; 2 CPUs: 3 instructions, 1 memory reads, 1 memory write per vector
; 4 CPUs: 1.5 instructions, .5 memory read, .5 memory write per vector
```

Figure 14. Pipelined Half-datum Optimal Specialized Matrix-vector Multiplication with SSE2 Instructions

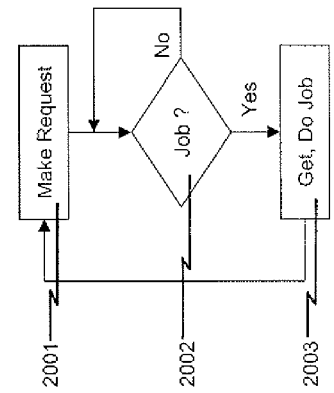
Figure 20. Job Loop Flow Chart
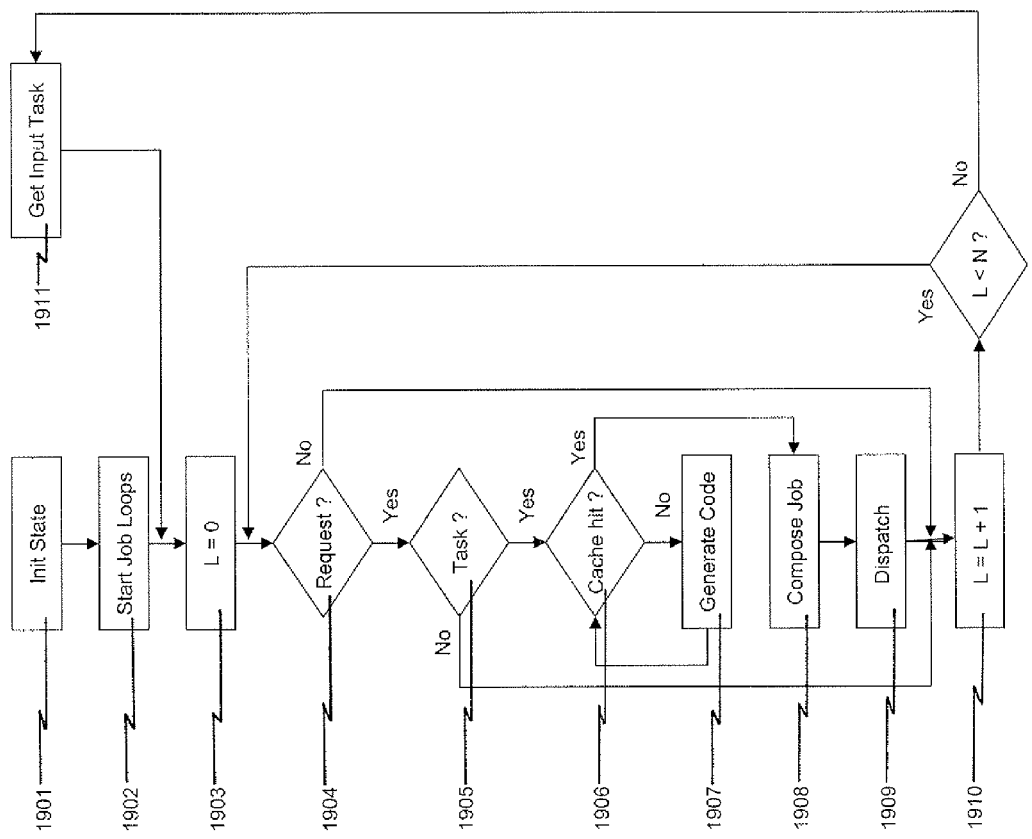
Figure 19. Main Program Flow Chart

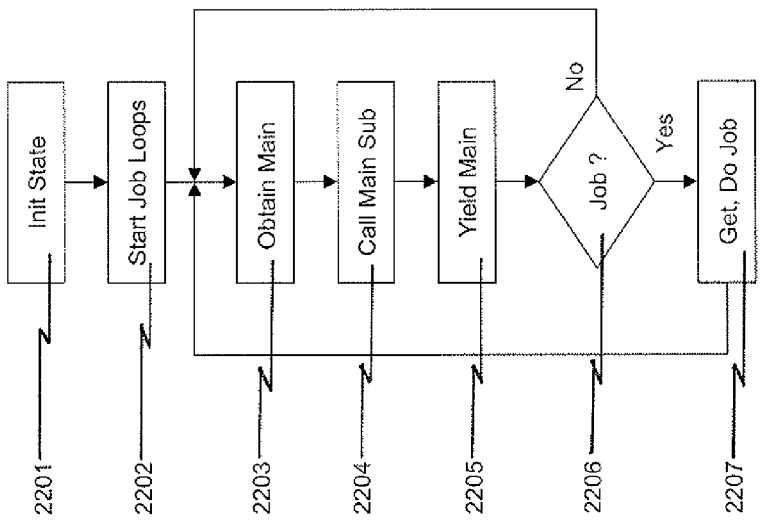
Figure 22. Alternate Job Loop Flow Chart
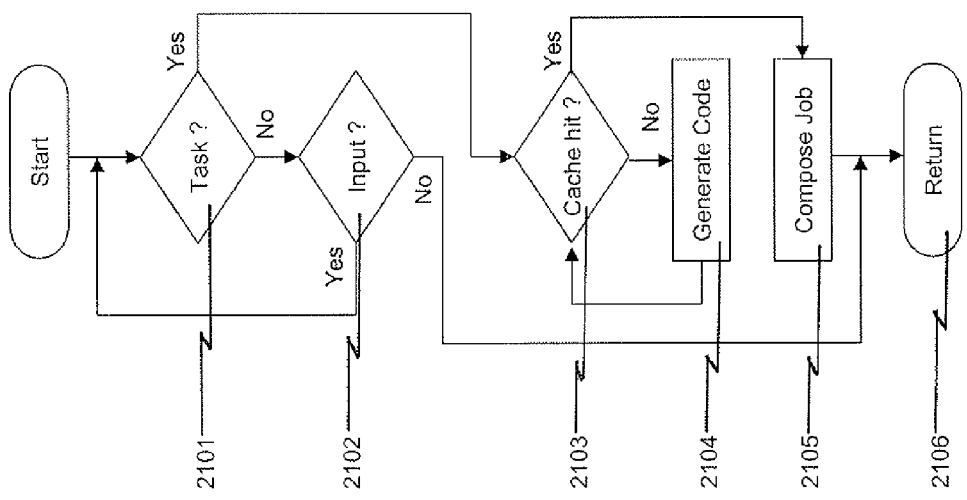
Figure 21. Alternate Main Sub-program Flow Chart

GENERAL PURPOSE SOFTWARE PARALLEL TASK ENGINE

CROSS-REFERENCE TO RELATED APPLICATIONS

This application claims priority under 35US§119(e) of U.S. provisional patent application 60/781,961, filed on Mar. 14, 2006, the specification of which is hereby incorporated by reference.

FIELD

The present description relates to the field of parallel processing of tasks in computer system. The description also relates to the field of software 3D image rendering.

BACKGROUND

Parallel Processing. Using multiple computer CPUs simultaneously or in parallel, to solve a single problem, or execute a single program, and by doing so, reducing the time required, is an old and well-studied idea. In fact parallel processing is an entire sub-discipline of computer science. Any system for accomplishing parallel solution of a problem or execution of a program has two components: A 'problem decomposition' strategy or scheme or method, or combination of methods, and an execution vehicle or machine or system. In other words, the problem must be broken down into multiple parts, and then these parts must be distributed to and executed by the multiple CPUs. Problems can sometimes be broken down into parts that are independent, which may be pursued completely in parallel, with no interaction between, or no specific ordering of, sub-programs to be executed on the CPUs required. Sometimes problem decompositions have inter-dependent parts, implicit in the problem, or created by the decomposition.

Problem decomposition methods can be sorted into two large categories: decomposition by domain, where the function to be performed remains the same, and the data to be processed is distributed to multiple CPUs, and decomposition by function, where the work to be done on each datum is broken up into sub-functions, and each CPU is responsible for performing its sub-function on all the data. Both types of decomposition can be achieved through two major means—implicit or problem-aware, specific, ad hoc means, built into the system, or 'algorithmic decomposition'. In algorithmic decomposition, the original program, or a representation of that program, which encapsulates the single-CPU, sequential semantics of a solution to the problem, is decomposed into multiple programs. Most interesting problem decompositions are a combination of both types of decomposition, using elements of both means of decomposition. The resulting CPU sub-programs may be completely independent, or 'perfectly parallel', or they may be organized into successive, overlapping, sub-functional stages, as in an assembly line or 'pipeline', or there may be any number of dependencies and independences, in any sort of dependency graph.

Systems of parallel execution of the sub-programs can be classified in terms of their similarity to two opposing models—those that have a central, master unit directing the flow of work, and those that are modeled as a de-centralized network of independent processors. Of course, many systems lie on the line somewhere in between these polar extremes.

As stated above, the field of parallel processing is rich in research, and there is much prior art. However there is as yet no general solution for all problems, and every parallel processing system is better at some sorts of problems than others. There are yet many problems with unexploited potential for parallelism, and many improvements may be made to parallel processing systems for different classes of problems.

Dynamic Code Generation. 'Dynamic code generation' is a technique whereby code is compiled or prepared for execution dynamically, by a program which will need to call or invoke it. This code is often created at the last possible moment, or 'just-in-time'. If the code is created only when it is about to be used, it will not be generated if it is never used, and this can represent savings in compilation time and program space. After compilation, the new routine can be retained, or cached, in case it is needed again. The required routine may be called under a particular set of prevailing conditions or with specific arguments, that suggest a simpler, more efficient, custom compilation unique to that invocation or set of conditions. In that case, the dynamic compiler might create a special version of the code to be used only under those conditions or with a similar invocation. Dynamic compilation may also allow superior general-purpose optimizations due to facts unknown at the time the program in question was specified, but known at the time of execution.

Dynamic code generation has often been used in environments where there is no obvious 'program' to be compiled, where a fixed function is replaced by a run-time generated, run-time specialized and optimized routine, in order to gain improved performance over statically compiled, necessarily general code. Because the 'program' is often not represented in formal semantic terms, or is represented only by the previously compiled, machine code for the function to be replaced, and because of the need to produce new code quickly in a run-time environment, dynamic code generators and optimizers are frequently simple affairs, exploiting high-leverage, problem-aware ad hoc methods or tricks to achieve their ends. In this case, the more high-leverage, informal or implicit, problem-specific information that can be imparted to these code generators, the better they can potentially perform.

One application in which parallel processing and dynamic code generation may be combined is a three-dimensional graphical image rendering system, or 'graphics pipeline'.

Definition of Graphics Pipeline. Three dimensional (3D) computer graphics display programs simulate, on a two dimensional display, the effect that the display is a window into a three dimensional scene. This scene can contain multiple 3D objects, at different apparent distances from the window, and the window has a viewpoint or camera angle with respect to the scene and its objects. Objects can be colored and textured, and the objects can seem to be illuminated by light sources of different types and color.

A software program that models and displays 3D objects can be divided into two parts: an 'application program' which relies on a set of high-level functions to manipulate and display graphical data, and a graphics software library that provides these functions.

3D objects consist of geometric shapes, at certain positions in the 3D world, with certain properties or attributes. These objects are defined and maintained by the application program, as a collection of geometric primitives, and then these primitives are defined and described to the graphics library, which draws, or renders them onto the two dimensional (2D) display, with all necessary positioning, orientation, perspective scaling, coloring, texturing, lighting, or shading effects performed on each primitive as it appears in the window view. This represents a series of processing steps on geometric primitives and their component data, as they progress from spatial coordinate and attribute definition to final 2D picture element (pixel) form on the screen. A software and hardware system that accomplishes this drawing of geometric primitives is called an image renderer, or a rendering 'engine', and the series of processing stages used is termed the 'graphics pipeline'.

Definition of terms, description of pipeline processing stages. FIG. 1 shows a generic graphics pipeline 100 for a rendering engine according to the prior art. Different renderers support different options and features, and use various techniques to perform the required processing at each stage. Operations and stages can also be, explicitly or implicitly, performed in different orders in different implementations, while preserving the same apparent rendering model. Stages or portions of stages may be performed to varying degrees by either software or hardware. There are also many different groupings or organizations of the component operations into pipeline stages for the purposes of exposition, and the terminology in the art is not uniform from one implementation to another.

The following definitions are used in the descriptions of the graphics pipelines below:
Primitive: a collection of points in 3D space forming a point, a line, a triangle, or other polygon, with associated properties.
Vertex: one of the points defining a primitive.
Object: a collection of primitives.
Normal: for a point on the surface of a primitive, a vector defined to be normal or perpendicular to the surface of the primitive at that point.
Model space: a 3D coordinate space in which an individual object is defined, apart from a 3D scene in which it may be placed.
World space: the coordinate space of the 3D scene.
Viewport or Camera: the window, with its associated orientation, position and perspective relative to the scene, through which the 3D scene is apparently being viewed.
View space: the coordinate space of the 3D scene, as seen from the viewpoint of the camera.
Face: a planar polygon in an object, either front-facing (toward the camera), or back-facing (away from the camera).
Model Transformation: scaling and placing an object in the scene, transforming its vertex coordinates from model space to world space.
Viewing transformation: translating (moving, positioning), and rotating (orienting) vertices to account for viewing position and orientation with respect to the scene, transforming vertex coordinates from world space to view space.
Material: light reflectivity properties.
Texture, or texture map: an image, which may be designed to visually mimic the surface properties of a physical material.
Lighting: the interaction of light sources of different types and colors, with colors and materials and textures, at vertices.
Primitive assembly: determining primitives as defined by the application, and gathering their component vertex coordinates and attributes, in preparation for further processing.
Clipping: removing primitives or portions of primitives which are not visible, or fall 'outside' the field and depth of view of the viewport.
Projection Transformation: creating the 2D projection of points in view space, onto the plane of the viewport or "film" of the camera, transforming spatial coordinates of vertices to 2D display locations and depths.
Culling: removing (deciding not to render) a face of a polygon.
Vertex Processing: vertex coordinate transformations, and lighting of vertices.
Frame buffer: a 2D memory array containing bit patterns encoded in a form which directly represents the colored dots or rectangles on the computer's hardware display screen.
Pixel: a single colored picture element (dot or rectangle) in the frame buffer.
Fragment or pre-pixel: a single colored picture element, located in a 2D image corresponding to the frame buffer, before it is written to the display frame buffer.
Rasterize: to choose the fragments in the 2D projected image that correspond to the outline and/or interior of a primitive.
Shading, or Fragment Shading: determining the color of a fragment, taking into account vertex colors, lighting, and textures.
Buffer or Raster operations: raster (pixel) operations done on fragments after shading, as they are written to pixels in the frame buffer, or to determine whether or not they should be written, according to a number of tests.
Fragment processing: fragment shading and buffer operations on starting with fragments, and yielding pixels.

A detailed description of the stages in the pipeline of FIG. 1 follows:

Transform 102: All vertices are transformed from model space to world space, and then transformed to view space, i.e., translated and rotated correctly in order to account for the viewpoint.

Light 104: Vertices are lighted from different sources, and the resulting color is dependent on the source color and intensity, incidence angle of a directional source with the vertex's normal, distance of the source, the reflectivity of an associated material, and the original vertex color. If the primitive is a polygon, and a texture is to be applied to the face, texture map coordinates are assigned to the vertices.

Assemble 106: Vertices are assembled into primitives, as they have been defined by the application program.

Project 108: Primitives are clipped to conform to the field and depth of view, the 'viewing volume'. They are then projected, possibly with perspective, onto the plane of the viewport, yielding a 2D image, with each vertex position now represented as a 2D display location and a depth. Polygon faces to be culled are discarded, and not processed further.

Rasterize 110: Primitive fragments corresponding to outlines and interiors are identified in the 2D image. 'Anti-aliasing', or modification of fragment colors at outlines of primitives in order to make the outline appear smoother, is done at this stage.

Shade 112: Primitive fragments are shaded, or colored, according to one of several possible methods, by either interpolating the colors at the vertices of the enclosing primitive or by interpolating from vertex normals and re-lighting the fragments individually. If a texture is to be applied, texture map coordinates are interpolated and assigned to each fragment, and the indicated texture color is mixed in to yield the shaded fragment color.

Buffer 114: As fragments are converted to pixels and written to the frame buffer, several tests are performed in order to determine whether or not they should be written, in order to allow displaying the image inside a stencil, or window, or rectangle. Hidden surface removal may also be done by recording the depth, or 'z' value of a pixel in a 'z-buffer', as the pixel is written to the 2D frame buffer. As new pixels are written to the frame buffer, their depth or z value is compared to the z-buffer value of the pixel previously written at that 2D location. If the new pixel is closer to the viewport, it is written, if it is further away than (behind) the old pixel, it is not written.

Pixel colors may also be blended with the color of pixels already in the frame buffer, depending on the opacity of those colors, in order to simulate transparency of nearer surfaces. Pixel colors may be 'dithered' or modified based on their near neighbors as a way of smoothing color transitions or simulating shades. Finally, source and destination pixels in the frame buffer may be combined according to one of several logical operations performed as part of the block transfer (BLT) to the frame buffer.

Another view of a graphics pipeline according to the prior art is seen in FIG. 2. In this pipeline 200, there are just three stages: 'Process Vertices' 202, 'Process Primitives' 204, and 'Process Fragments' 206. FIG. 1 'Transform' (model and view transformations) 102, and FIG. 1 'Light' 104 (lighting) are collapsed into FIG. 2 'Process Vertices' 202, yielding lighted, 3D position-transformed vertices. FIG. 2 'Process Primitives' 204 combines FIG. 1 'Assemble' 106 (primitive assembly), FIG. 1 'Project' 108 (clipping, projection, and culling), and FIG. 1 'Rasterize' 110 (rasterization) yielding visible fragments within the 2D image corresponding to primitive outlines and/or interiors. FIG. 2 'Process Fragments' 206 incorporates FIG. 1 'Shade' 112 (fragment shading and texture application to color fragments), and FIG. 1 'Buffer' 114 (raster or buffer operations), finally yielding pixels 116 in the frame buffer.

In typical practice, aspects of the 'Project' 108 computation may be split across vertex processing and primitive processing. All vertex position transformations, including those due to projection onto multiple depth 2D planes, can be done in 'Process Vertices', while those aspects of projection necessary for clipping and final mapping to the viewport are done in 'Process Primitives'. This may be done in order to group all like position transformations, involving matrix arithmetic on vertex vectors, into one phase. How parts of the logical graphics computations are actually effected in which stages is not of primary importance. More important is that each of the three large stages is concerned with processing associated with one major data type: either vertices, or primitives, or fragments.

Existing practice in graphics pipelines.

SIMD CPU instructions. Many computer CPUs now incorporate SIMD (single-instruction-multiple-data) types of instructions, which can perform certain single operations on multiple data at once. These instructions have been geared toward common low-level operations in the graphics pipeline, and software graphics library implementations can show dramatically improved performance through their use. It is important however, that the library organizes its computations so that data is available and staged accordingly, to take best advantage of these SIMD capabilities.

Multi-core CPUs. CPUs are now available with multiple instruction-processing cores, which may run independently of each other. If tasks in the graphics pipeline can be divided and scheduled so that many different operations can be done in parallel, independent threads of execution, this can provide a geometric speed increase over a single program that must perform all the operations in sequence. Multi-core techniques have heretofore seen limited application in software graphics pipeline implementations.

Hardware GPU functions. Many of the functions of a graphics pipeline can be performed by the hardware graphics processing unit, or GPU. GPUs support many fixed-functionality operations, and many also have the capability of running programs locally, independent of the computer CPU. Hardware GPU functions or GPU programs may be considerably faster than their main CPU software counterparts.

Shader Programs. 'Vertex shaders' or 'vertex programs', can optionally be supplied to the graphics library to perform some or all of the functions of vertex processing. Likewise, 'Fragment Shaders' or 'Pixel Shaders' can take over much of the job of fragment processing. These programs can be executed by the computer's CPU, or they may run in part or entirely on the hardware GPU. Several standards and languages exist for these vertex and fragment shader programs, which are then compiled for execution on CPU and/or GPU.

Programmable vertex and fragment processing allow flexibility and specialization in the performance of these operations, allowing new functionality, or higher performance. Support for programmable shaders is a required feature in several graphics library definitions, and many compatible implementations exist. However, the compilation of the shader program, the quality of the resulting code, and the use of CPU and GPU resources and their effects on performance, differ considerably from one implementation to another.

Dynamic code generation. Dynamic code generation is used in various ways in many aspects of existing fixed-function and programmable graphics pipelines, but generation and caching policies, language translation techniques and optimizations, and effectiveness and scope of utility vary with the implementation.

For example, in some graphics libraries, dynamic code generation is limited to the compilation of application-provided vertex and fragment programs. Or, if dynamic code is also used to accelerate fixed graphics pipeline functions, there may be some elements of the graphics pipeline implementation which must be implemented in a static fashion, or by separate dynamically created functions, to leave those stages 'open' for replacement by either application-provided or GPU-supported functions. The ideal case is to have all functions of the graphics pipeline supported by dynamically created code optimized for the specific CPU and GPU capabilities of the computer system.

SUMMARY

The description relates to the general prosecution of work on multiple, independent computer CPUs, and the design of systems, methods, and policies, to accomplish that work efficiently, with respect to time and resources.

One application of such systems is the task of rendering (drawing) to a computer display a three dimensional image represented by an abstract collection of graphical data, and the many processing steps required to appropriately reduce this data to a two dimensional color picture. The description addresses this application, as well as others.

There is described a design for a software Parallel Task Engine which combines dynamic code generation for processing tasks with a scheme for distributing the tasks across multiple CPU cores. Dynamic code generation provides the best possible per-processor performance, and fully parallel execution provides the best use of multiple CPUs. However, when combined in the right way, the two techniques can have a beneficial 'multiplicative' effect as well—because the processing routines are created for certain sub-tasks of the larger problem or operate only on particular subsets of data, they can be even more specifically or efficiently coded than before, as they operate under more specific circumstances, or are less constrained by processor resources. The result is better performance than would be expected from the sum of the benefits of these two practices, applied independently—or in other words, a 'super-linear' acceleration when multiple CPUs are applied to the problem.

Application to Graphics Processing. Methods of dynamic code generation can be used to create all the software routines necessary to execute the stages of a graphics pipeline. These routines can be more efficient than code that is statically compiled in advance, because they can take advantage of facts that are not known until the time of execution, and because they can be created specifically for the job at hand, and need not satisfy the full range of requirements that their interface and surrounding state might demand of a single, static routine.

New computers have multiple, independent CPU cores that can execute software routines in parallel. The workload of a graphics processing task can be distributed across multiple CPUs, achieving performance acceleration that is linear with the number of CPU cores employed.

When the parallel task engine is applied to the problem of graphics processing, in other words, configured as a graphics pipeline engine, it can provide dynamically generated code for all stages of computation, and exploit specific task decompositions that take best advantage of the strengths of dynamic code generation and multiple CPU resources applied to graphics processing, resulting in high speed image rendering.

According to an embodiment, there is provided, in a computer system, a parallel task engine for performing tasks on data. The parallel task engine comprising: an input for receiving tasks; a scheduler for decomposing the tasks into one or more new tasks, the decomposing being dependent on at least one policy selected from a given set of policies; a run-time dynamic code generator for generating or locating, from the new tasks, operation routines; a set of job loops, at least one of the job loops for performing the new tasks on at least part of the data by executing the operation routines; the scheduler for distributing and assigning the new tasks to the at least one of the job loops; and the scheduler for making the selection of the at least one policy as a function of characteristics of the operation routines generated or located by the run-time dynamic code generator.

According to an embodiment, there is provided, in a computer system, a method for performing tasks on data. The method comprises: receiving tasks; decomposing the tasks into one or more new tasks, the decomposing being dependent on at least one policy selected from a given set of policies; generating or locating, from the new tasks, operation routines; making the selection of the at least one policy as a function of characteristics of the operation routines generated or located by the run-time dynamic code generator; providing a set of job loops; distributing and assigning the new tasks to at least one of the job loops; and the at least one of the job loops performing the new tasks on at least part of the data by executing the operation routines.

BRIEF DESCRIPTION OF THE DRAWINGS

Further features of the present application will become apparent from the following detailed description, taken in combination with the appended drawings, in which:

FIG. 4 is a block diagram showing the composition of a job according to an embodiment;

FIG. 5 is a block diagram showing the composition of a task according to an embodiment;

FIG. 6 is a block diagram showing the composition of a command according to an embodiment;

FIG. 10 is the source code for a routine which performs a full-datum matrix-vector multiplication with SSE3 instructions according to an embodiment;

FIG. 11 is the source code for a routine which performs a half-datum matrix-vector multiplication with SSE3 instructions according to an embodiment;

FIG. 12 is the source code for a routine which performs a specialized half-datum matrix-vector multiplication with SSE3 instructions according to an embodiment;

FIG. 13 is the source code for a routine which performs an optimal half-datum matrix-vector multiplication with SSE2 instructions according to an embodiment;

FIG. 14 is the source code for a routine which performs a pipelined half-datum matrix-vector multiplication with SSE2 instructions according to an embodiment.

FIG. 19 is a flow chart depicting the Parallel Task Engine Main Program, according to an embodiment;

FIG. 20 is a flow chart depicting the Job Loop Program, according to an embodiment;

FIG. 21 is a flow chart depicting an alternative Parallel Task Engine Main Sub-program, according to an embodiment; and FIG. 22 is a flow chart depicting an alternative Job Loop Program, according to an embodiment.

Figure 1:
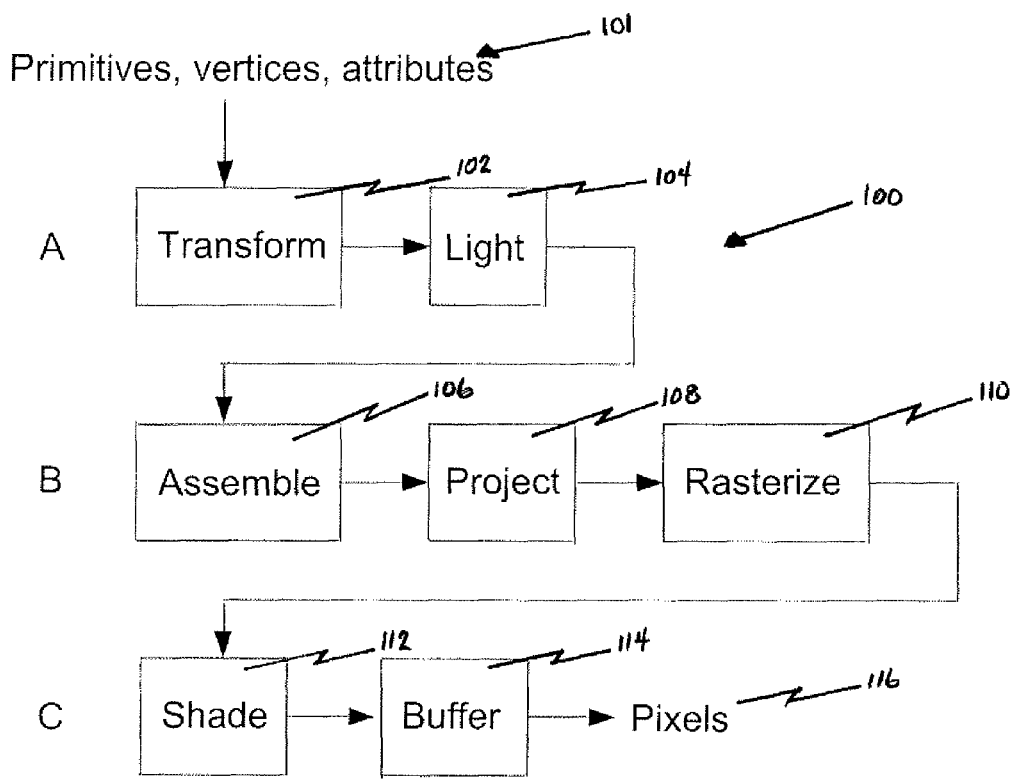
FIG. 1 is flow diagram depicting a generic graphics pipeline according to the prior art.

It will be noted that throughout description and the appended drawings, like features are identified by like names, e.g. "Command, "Task", "Job", and reference numerals direct the reader to the appropriate drawing to show the instance or aspect of the feature in the frame of reference of the discussion. For example, in the discussions below, 'input Task 302' is a Task 500, the structure of which is detailed in FIG. 5, but in this reference, attention is directed to this specific Task in FIG. 3. Sometimes the same instance of an element will be described with different reference numerals, in order to direct the reader's attention to different aspects of it or operations being performed on it. Numerals do not specify unique structures, nor do they specify the instance of an element being discussed. Elements with the same name have the same structure, and particular instances of elements are specified in the discussion explicitly.

DETAILED DESCRIPTION

Figure 3:
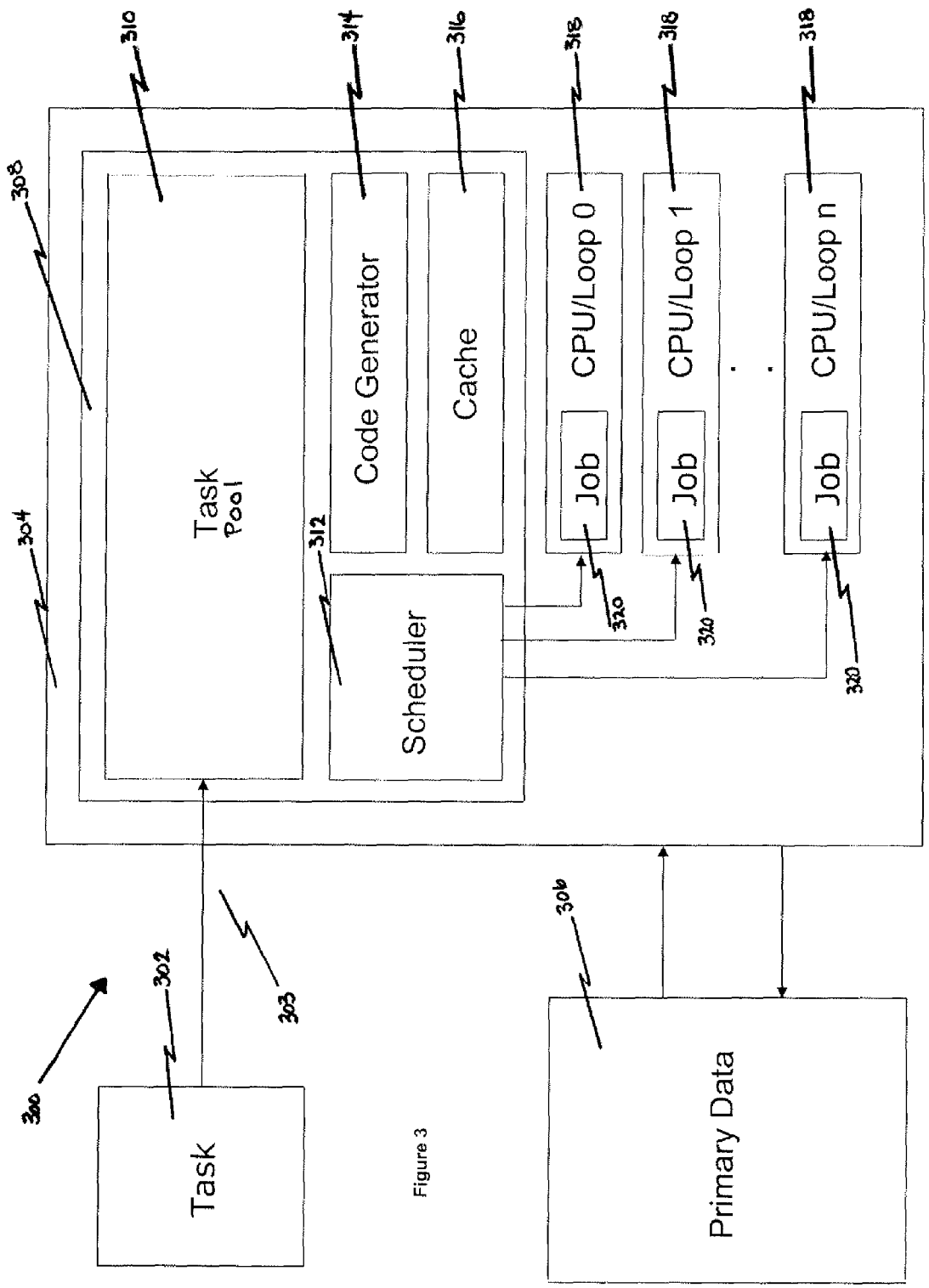
FIG. 3 is a block diagram depicting a parallel task engine according to an embodiment.

Referring to FIG. 3, a Parallel Task Engine 300 is an apparatus for performing Tasks 302 on arrays of Primary Data 306. Primary Data 306 is data external to the apparatus. A Task 500

(see FIG. 5) is a Command 510 and a collection of one or more Data Pointers 520, which are POINTERS referencing Primary Data 306. A POINTER is an address, index, or token that can be used to locate a single datum or an array of data, either directly or indirectly via one or more tables. A Command 600 (see FIG. 6) is an Operation 610 and zero, one or more Parameters 620. An Operation 610 is a value that indicates a specific function to be performed on the Primary Data 306 referenced by the Data Pointers 520, and Parameters 620 are values that further specify the Operation 610, for example, a number of data items to be processed.

Parallel Task Engine 300 is composed of:

1. The current CONTEXT, which is a set of variables, or a POINTER to a set of variables, containing auxiliary data, modes and details of computations to be performed on the Primary Data 306 to be processed. The CONTEXT is only read by the Parallel Task Engine, and not written by it. CONTEXT variables are initialized and written by the external software entities that send Tasks 302 to the engine, the "users" of this engine. If the CONTEXT is a POINTER to a set of variables, it points to a set of variables maintained by, and the value of this POINTER is set by, external software entities.

2. A Task input 303, to receive input Tasks 302.

3. A Task Pool 310 of Tasks 500, awaiting dispensation.

4. One or more Job Loops 318. In a typical embodiment, one Job Loop 318 will be allocated per CPU available for use by the Parallel Task Engine 300 in the dispensing of work. It is also possible to run more than one Job Loop 318 on a CPU, or to run a Job Loop 318 on a CPU also running other programs. The multiple CPUs, and the computer hardware, software, and operating facilities which allow a software system to establish programs running on multiple CPUs, are those known to persons skilled in the art, and will vary from computer system to computer system. The Parallel Task Engine 300 assumes and utilizes these facilities in a particular way, setting up programs on CPUs as necessary in order to dispatch and accomplish Tasks 500. The Job Loop 318 receives a Job 320, from the Parallel Task Engine Main Program (not shown, but described in detail below). Now referring to FIGS. 4, 5, and 6, a Job 400 is the combination of a Task 420 and a Code Pointer 410 to a routine which can execute an Operation 610. When the Main Program assigns the Job 320 to the Job Loop 318, the Job Loop 318 calls the Operation 610 routine, with Parameters 620, via the Code Pointer 410, in order to process the Primary Data 306 specified by the Task 420 via its Data Pointers 520 according to the Command 510 specified by the Task 420. After the Operation 610 routine returns, the Job Loop 318 will wait to receive the next Job 320 from the Main Program.

5. A Code Generator 314, which is responsible for creating or finding Operation 610 routines, which perform Operations 610 on Primary Data 306, under the current CONTEXT.

Figure 7:
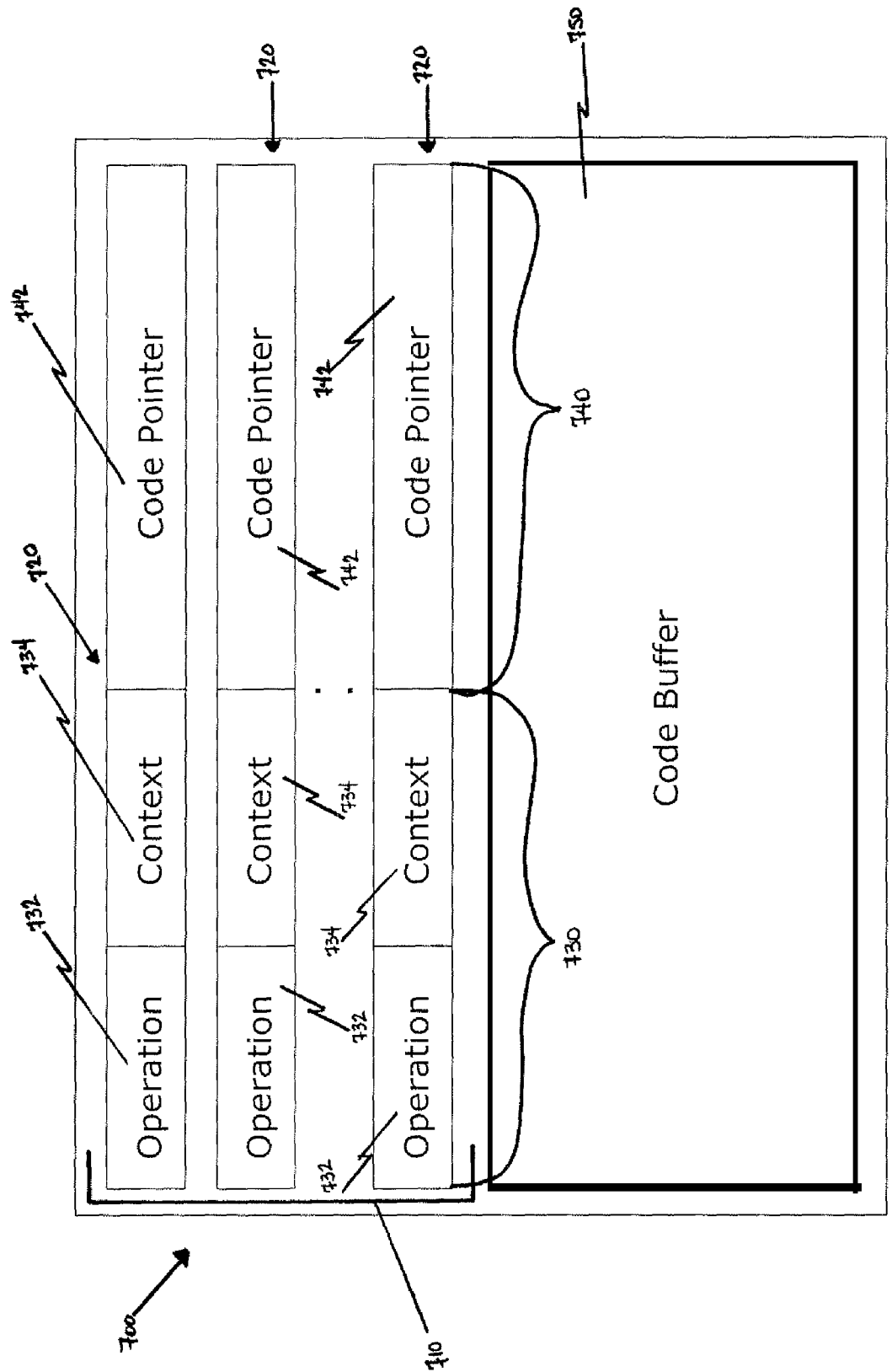
FIG. 7 is a block diagram showing the cache as a collection of entries, and the composition of those entries according to an embodiment.

6. A Cache 316, detailed on FIG. 7 as Cache 700, which is a Directory 710 composed of Entries 720, and a Code Buffer 750. The Entries 720 are composed of a Tag 730 to be matched, which consists of an Operation 732 and a Context 734, and Data 740, which is a Code Pointer 742 to a routine which performs the Operation 732. A CONTEXT, as defined above, specifies the conditions under which Operations 610 are to be performed, or augments or modifies the meaning of Operations 610, and thereby influences the generation of code to perform Operations 610, or influences the execution of that code. The Context 734 accompanying the Operation 732 and the Code Pointer 742 to the Operation 732 routine in an Entry 720 is the specific CONTEXT that was current at the time the Operation 732 routine was created or located by the Code Generator 314, and the Entry 720 was created. To find a routine in a Cache 700 to perform an Operation 610 under the current CONTEXT, it is necessary to match the specified Operation 610 and the current CONTEXT with the Tag 730 (Operation 732 and Context 734) of an Entry 720. The Code Buffer 750 is the repository for storage of Operation 610 routines created dynamically by the Code Generator 314. How the Entries 720 in the Cache 316 Directory 710 are organized for lookup, via indexing, hashing, or sequential search is not essential to the present description. Likewise, when new Entries 720 are created, given that the Directory 710 is of fixed size, this will necessitate at times overwriting old Entries 720. The policies for Entry 720 eviction in such cases are also considered to be implementation specific details.

7. A Scheduler 312, which when requested, surveys the Task Pool 310 of Tasks 500, and determines the appropriate Task 500 to assign to a specified Job Loop 318. The Scheduler 312 is responsible for decomposing Tasks 905 as necessary, maintains the Task Pool 310, maintains a record of Tasks 500 in progress on the Job Loops 318, and understands the dependencies between Tasks 500.

8. A Parallel Task Engine Main Program, which directs the operation of the engine, and communicates with the Job Loops 318. The Main Program dispenses Jobs 320 to Job Loops 318. The Main Program gets the Task 420 for the Job 320 from the Scheduler 312, and looks up the Code Pointer 410 for the Job 320 by matching the Operation 610 in the Command 510 in the Task 420, and the current CONTEXT, to the Tag 730 of an Entry 720 in the Directory 710 of the Cache 316. If the proper Code Pointer 410 for the Operation 610 cannot be found in the Cache 316 Directory 710, the Main Program calls the Code Generator 314 to create or find a suitable routine, and then creates a Directory 710 Entry 720 for future reference.

All elements of the Parallel Task Engine 300 operate under, and may read from the current CONTEXT, including the Operation 610 routines executed by the Job Loops 318. Only Operation 610 routines actually access the Primary Data 306 for which the engine is configured to process. The rest of the Parallel Task Engine 300 is concerned with dispensing Jobs 320 to the Job Loops 318.

Also, the Job 400, Task 500, and Command 600 data structures are 'nested' structures—they could each be represented by other structures that incorporate the same basic information in a less hierarchical form—the exact form of these data structures is not relevant to the essential operation of the Parallel Task Engine 300, other representations of the same information would serve as well—these forms were chosen because they represent a unit of work or a key aspect of that work at the level at which they are created or utilized.

A detailed, step by step description of the operation of the Parallel Task Engine programs follow. These descriptions employ single-threaded loops that may be represented by a flow chart. No reference is made to processes or synchronization mechanisms or other features of computer operating systems that may be used to improve the efficiency of an implementation of this engine. An embodiment may implement the following step-by-step methods directly, or it may employ system-specific features or alternative formulations that preserve the functional operation of the engine as described here. This description is not the only representation or embodiment possible, and others are easily imaginable. However this description does suffice to demonstrate the proper operation of the engine in a form that is transferable to many computer systems, assuming some multiple, parallel CPU facility, and a shared memory to which all CPUs have access.

Parallel Task Engine Main Program (FIG. 19):

Step 1901. Initialize the Cache 316 Directory 710 Entries 720, making all the Tags 730 'un-matchable', (perhaps by loading Context 734 with a value that will never match any current CONTEXT).

Step 1902. Set up multiple Job Loops 318, according to CPUs of different numbers and types available. For each Job Loop 318, set REQUEST and DISPATCH counts to zero. These counts are integers, which may be of any width, including 1 bit. Each Job Loop 318 also has an incoming Job 320 POINTER variable. Start the Job Loops 318 on the CPUs (Job Loop 318 detailed below).

Step 1903. Set L, an integer variable, to 0. Set N, an integer variable, to the number of Job Loops 318. L represents the index of the Job Loop 318 under consideration in steps 1904 through 1910, below, and ranges from 0 to N−1.

Step 1904. Inspect Job Loop 318 L's REQUEST count. If it is the same as the DISPATCH count, go to step 1910.

Step 1905. Call the Scheduler 312 to pick a Task 500 for Job Loop 318 L, and remove it from the Task Pool 310. If necessary, the Scheduler 312 will decompose a Task 905 and place the new Tasks 940 in the Task Pool 310, before picking a Task 500 for the Job Loop 318, which it returns to the Main Program via a POINTER. If no Task 500 can be found, go to step 1910.

Step 1906. Look in the Cache 316 Directory 710 for an Entry 720 with a Tag 730 that matches the Operation 610 specified by the Task 500 and the current CONTEXT. If a matching Entry 720 is found, go to step 1908.

Step 1907. Call the Code Generator 314 to create or find a routine for the Operation 610 under the current CONTEXT. Create an Entry 720 in the Cache 316 Directory 710 containing the specified Operation 610 in Operation 732, the current CONTEXT in Context 734, and a pointer to the Operation 610 routine in Code Pointer 742. Go to Step 1906.

Step 1908. Compose the Job 320 as a Job 400 with the Task 500 from the Scheduler 312 in Task 420, and the matching Entry 720 Code Pointer 742 in Code Pointer 410, and place a POINTER to Job 320 in Job Loop 318 L's incoming Job 320 variable.

Step 1909. Set Job Loop 318 L's DISPATCH count to the value of its REQUEST count.

Step 1910. Increment L. If L is less than N, go to step 1904.

Step 1911. Pull the next input Task 302 from the Task input 303, if there is one, and place it in the Task Pool 310. Go to step 1903.

Job Loop 318 (FIG. 20):

Step 2001. Increment this Job Loop's 318 REQUEST count.

Step 2002. Inspect this Job Loop's 318 DISPATCH count. If it is not the same as the REQUEST count, go to step 2002 (repeat this step).

Step 2003. From the incoming Job 320 POINTER variable, get the Job 320 to do. Call the Operation 610 routine, via the Code Pointer 410 with Parameters 620, to process the Primary Data 306 as specified by the Task 420 Data Pointers 520, according to the Command 510 of the Task 420. Go to step 2001.

The preceding two program descriptions characterize the complete, high-level operation of the Parallel Task Engine 300, in an embodiment without program or execution thread synchronization or signaling. Both the Main Program and the Job Loops 318 are polling loops. When there is no work to do, both programs 'spin' or are 'busy waiting'. A first improvement to this implementation, in a program environment that supports it, would be to cause the Main Program and Job Loops 318 to block or sleep when there are no input Tasks 302 to decompose or dispatch, and no Jobs 320 to do, and to resume operation when input Tasks 302 and Jobs 320 arrive. This would make more efficient use of any CPU that is shared by multiple programs. In the case of the Main Program and a Job Loop 318 running on the same CPU, it would also be desirable for the Main Program to run at a lower priority than the Job Loop 318, or utilize some other mechanism to ensure that the Main Program does not continue to spin or accept input Tasks 302 when the Job Loop 318 on the same CPU is executing a Job 320. The two program loops operate in a producer/consumer relationship. The Main Program produces Jobs 320, and the Job Loops 318 consume and do the Jobs 320. Any sequence or coordination scheme that reliably effects the same results, with the same components, is an alternative embodiment of the Parallel Task Engine 300.

In another possible embodiment, the Job Loops 318 may incorporate and call a version of the Main Program directly. In this case it is necessary to ensure that multiple Job Loops 318 have mutually exclusive access to the Main (sub) Program. This can be done by using operating system software facilities, atomic read-modify-write CPU instructions, or through any one of several software mutual exclusion algorithms, such as Dekker's algorithm, or Peterson's algorithm.

In this case, the Main Program becomes a sub-program or subroutine which executes according to the following procedure:

Alternative, Parallel Task Engine Main (Sub) Program (FIG. 21):

L, an integer variable, is passed into the Main (sub) Program by the calling Job Loop 318, and represents the index of the Job Loop 318 under consideration in the following steps.

Step 2101. Call the Scheduler 312 to pick a Task 500 for Job Loop 318 L, and remove it from the Task Pool 310. If necessary, the Scheduler 312 will decompose a Task 905 and place the new Tasks 940 in the Task Pool 310, before picking a Task 500 for the Job Loop 318, which it returns to the Main Program via a POINTER. If a Task 500 is found, go to step 2103.

Step 2102. Pull the next input Task 302 from the Task input 303, if there is one, and place it in the Task Pool 310. If there was an input Task 302, go to step 2101. If there was no input Task 302, go to step 2106.

Step 2103. Look in the Cache 316 Directory 710 for an Entry 720 with a Tag 730 that matches the Operation 610 specified by the Task 500 and the current CONTEXT. If a matching Entry 720 is found, go to step 2105.

Step 2104. Call the Code Generator 314 to create or find a routine for the Operation 610 under the current CONTEXT. Create an Entry 720 in the Cache 316 Directory 710 containing the specified Operation 610 in Operation 732, the current CONTEXT in Context 734, and a pointer to the Operation 610 routine in Code Pointer 742. Go to Step 2103.

Step 2105. Compose the Job 320 as a Job 400 with the Task 500 from the Scheduler 312 in Task 420, and the matching Entry 720 Code Pointer 742 in Code Pointer 410, and place a POINTER to Job 320 in Job Loop 318 L's incoming Job 320 variable.

2106. Return to the calling Job Loop 318, indicating whether or not a Job 320 is ready. The Job Loop 318 which calls the Main (sub) Program is detailed below.

Alternative Job Loop 318 which calls Main (Sub) Program (FIG. 22):

Step 2201. If this is the first Job Loop 318, initialize the Cache 316 Directory 710 Entries 720, making them 'un-matchable'.

Step 2202. If this is the first Job Loop 318, set up multiple other Job Loops 318, according to CPUs of different numbers and types available. Each Job Loop 318 has an incoming Job 320 POINTER variable. Start the other Job Loops 318 on the CPUs.

Step 2203. Obtain exclusive access to the Main (sub) Program.

Step 2204. Call the Main (sub) Program.

Step 2205. Yield exclusive access to the Main (sub) Program.

Step 2206. If there is no Job 320 to do, go to step 2203.

Step 2207. From the incoming Job 320 POINTER variable, get the Job 320 to do. Call the Operation 610 routine, via the Code Pointer 410 with Parameters 620, to process the Primary Data 306 as specified by the Task 420 Data Pointers 520, according to the Command 510 of the Task 420. Go to step 2203.

The two other sub-program components of the Parallel Task Engine 300, the Code Generator 314 and the Scheduler 312, are now detailed in turn.

Code Generator (or Run-Time Code Generator): The Code Generator 314 is an element of the Parallel Task Engine 300. The design of any particular Code Generator 314, and the specific methods by which the Code Generator 314 accomplishes its work will vary according to the specifics of the embodiment The way in which a Code Generator 314, fulfilling the requirements detailed below, is used by the Parallel Task Engine 300, as described above, and as will be detailed further in the exposition of specific applications, is part of an embodiment, and its application of techniques of dynamic code generation.

Figure 8:
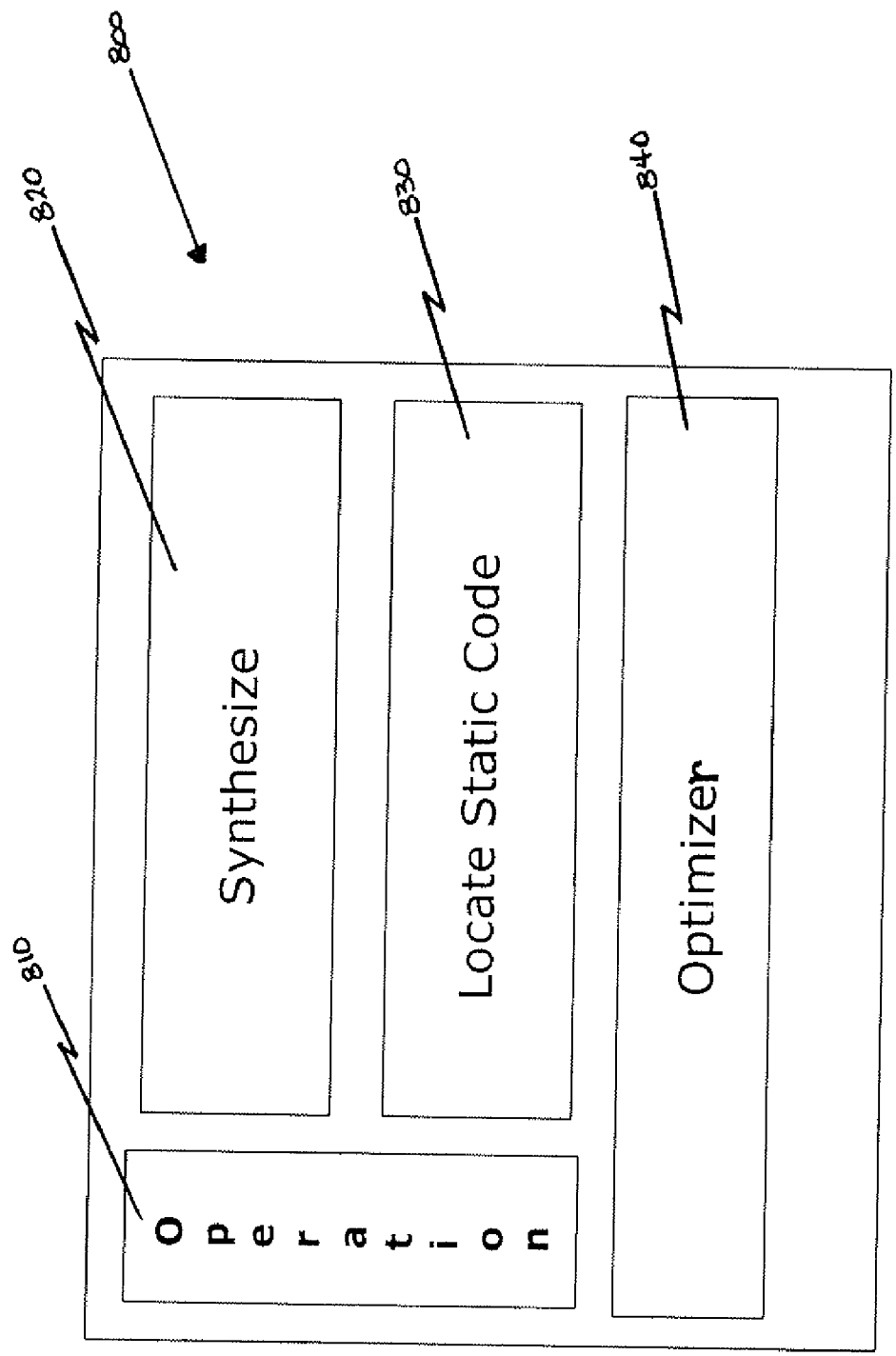
FIG. 8 is a block diagram depicting the components of code generation according to an embodiment.

As shown in FIG. 8, the Code Generator 314 may 'generate' an Operation 810 routine in one of two ways:

1. It may Synthesize 820 code to perform the Operation 810, from a higher level, meta-code description of Operations 810, or from ad-hoc code emitting routines, one for each Operation 810, or through other means.

2. It may have 'canned', statically compiled (Locate Static Code 830) Operation 810 routines, or fragments of Operation 810 routines, which may be used as-is, or concatenated together, to form Operation 810 routines.

Either method is acceptable, or code generators in typical embodiments may use both methods. Method 2 extends the notion of Code Generator 314 to a function which simply looks up a static Operation 810 routine in a table—for the purposes of the description, this style of code 'generation' is sufficient.

The Code Generator 314 must also have the capability of 'specializing' the code generated, by the CONTEXT outstanding at the time of generation, resulting in an Operation 810 routine specifically generated for use in that CONTEXT.

For example, if a generic routine for an Operation 810 has execution conditional on CONTEXT variables, and these variables are known to be of a certain value that will remain constant over the execution of the routine, the Code Generator 314 may generate custom code that assumes these values. Again, this may be done as simply as modifying a table look-up of the Operation 810 requested by adding elements from the CONTEXT to the index into the table, returning the proper, more specific static routine.

The Code Generator 314 may also contain a general Optimizer 840, which can accept as input, generated (Locate Static Code 830 or Synthesized 820) Operation 810 routines, or meta-code representations of those routines, and output more efficient routines or meta-code representations. Optimization techniques well-known in the art include constant-folding, reductions in strength, dead store elimination, common sub-expression elimination, copy propagation, instruction combination, branch chaining and elimination, loop unrolling and loop-invariant code motion, and global register allocation. These techniques and others may be used by an Optimizer 840.

The Code Generator 314 may also use the Optimizer 840 in order to accomplish specialization of a Synthesized 820 or static routine. For example, if a generic Operation 810 routine computes four values as output, but a more specific sub-Operation 810 requires only one value as output, the Code Generator 314 may select the generic routine, and pass it to the Optimizer 840, informing the Optimizer 840 that the three unwanted values are to be considered dead stores. The Optimizer 840 will then create the specialized, one-value-computing routine.

The Code Generator 314, when generating new Operation 610 routines, will store the code contents of these routines to the Cache 316 Code Buffer 750. Because that storage space is finite, it will eventually be exhausted, and require some existing code to be overwritten, destroying some Operation 610 routines that reside in the Code Buffer 750. How storage space is managed in this buffer is an implementation detail. However it is required that the Code Generator 314 invalidate, or make un-matchable, any Cache 316 Directory 710 Entries 720 with Code Pointers 742 that reference code that has been overwritten, at the time that the corresponding Operation 610 routines are destroyed.

Scheduler: Alternate embodiments may pursue different strategies or policies, as appropriate for the particular application of the Parallel Task Engine 300, but there are basic functions that all Scheduler 312 implementations must perform, and there are certain constraints that must be observed.

The Scheduler 312 maintains the Task Pool 310 of outstanding Tasks 500, and keeps a record of the Task 500 in progress on each Job Loop 318. With the Tasks 500 the Scheduler 312 may, but is not required to, keep additional information, such as: 1. The time, or a sequence counter, indicating when the input Task 302 was received from the Task input 303. 2. An estimate of the size of a Task 500, or time to completion. 3. Any other statistics or auxiliary information that may assist the Scheduler 312 in its work.

The Scheduler 312 has one function, as called from the Main Program—to remove a Task 500 from the Task Pool 310, and assign it to a Job Loop 318, returning that Task 500 to the Main Program, which will compose a Job 400 consisting of a Task 420 and an Operation 610 routine Code Pointer 410, and pass this Job 320 to the Job Loop 318. In the process of doing so, it may decide to decompose a Task 905 into other Tasks 940, adding the Tasks 940 to the Task Pool 310, before choosing and assigning the Task 500 to the Job Loop 318.

Figure 9:
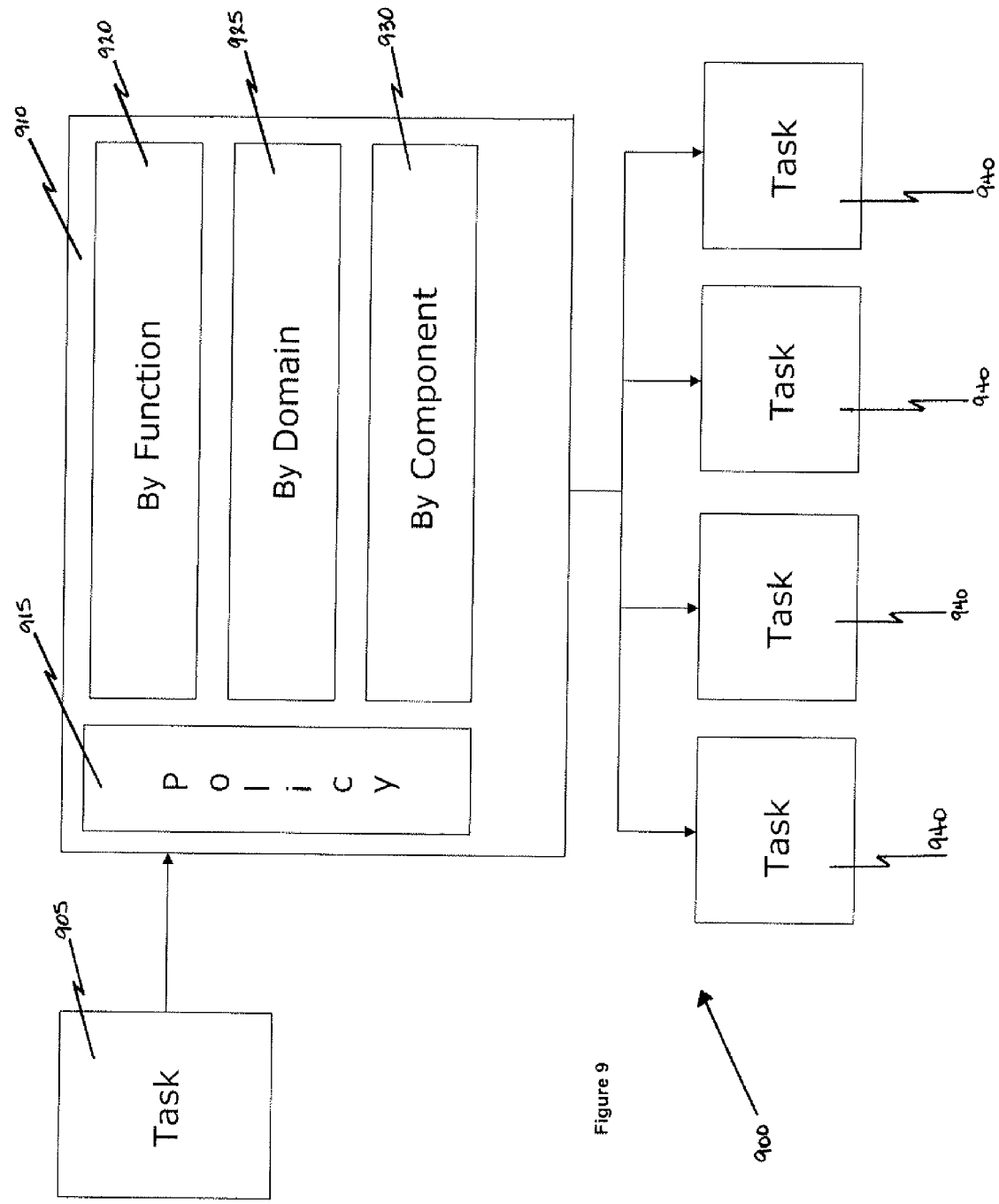
FIG. 9 is a block diagram depicting task (problem) decomposition according to an embodiment.

As shown in FIG. 9, the Scheduler 312 from FIG. 3 may use one of three policies to decompose a Task 905:

1. By-Function 920—the Task 905 can be effected by one or more Tasks 940 which each applies sub-FUNCTIONS or sub-Operations 610, to the indicated Primary Data 306. If the sub-Operations 610 must be applied sequentially, the original Task 905 becomes new Tasks 940 which form a pipeline. If the Operations 610 are independent, they may be dispatched in parallel. The new Operations 610 and Tasks 940 may have arbitrary dependencies, allowing some to be dispatched in parallel or in arbitrary order, and requiring some to be dispatched only after the completion of others. The new Tasks 940 reference the same Primary Data 306, but have different Commands 510 (Operations 610 and Parameters 620).

2. By-Domain 925—the Command 510 can be effected by independently applying the Operation 610 to different subsets or domains of the Primary Data 306. One Task 905 becomes one or more independent Tasks 940, which may be executed in parallel The new Tasks 940 all contain the original Operation 610, but the Parameters 620 and/or Data Pointers 520 are modified to assign different Primary Data 306 domains to each new Task 940.

3. By-Component 930—An Operation 610 is defined to operate on arrays of data, in other words, one or more data items, which are atomic from the point of view of the Operation 610. By-Component 930 decomposition of Tasks 905 divides the Primary Data 306 to be processed, or the new Primary Data 306 to be computed, into domains which are 'sub-atomic' or sub-components of the data processed by the original Operation 610, effecting the original Operation 610 by one or more component Operations 610. These component Operations 610 and the resulting Tasks 940 may or may not have inter-dependencies. By-Component 930 decomposition is a combination of methods 1 and 2, it is decomposition By-Domain 925, below the level of an Operation 610's natural atomic datum, in order to get, or resulting in, decomposition By-Function 920.

As described above, the Scheduler 312 can achieve ordinary decomposition of Tasks 905 By-Domain 925, by simply modifying a Task's 905 Data Pointers 520 or Parameters 620. Likewise, in order effect decomposition of Tasks 905 By-Function 920, the Scheduler 312 can simply create the requisite Tasks 940 with sub-Operations 610. These new Operations 610 naturally suggest new Operation 610 routines, with new code. However, as described above, the Code Generator 314 may decide that the sub-Operation 810 routine code is best generated by optimizing or specializing more general Operation 810 code. In this case, the Parallel Task Engine 300 can be said to use the Optimizer 840 to accomplish functional Task 905 division by 'algorithmic decomposition'.

Given Tasks 905, which may be decomposed as the Scheduler 312 sees fit, and a Job Loop 318 requesting a Job 400, containing a Task 500, the Scheduler 312 when called by the Main Program must choose a Task 500 for the Job Loop 318. The Scheduler 312 may use any sort of ordering to choose the next Task 500, e.g. first-come-first-served, starting the largest jobs first, finishing related Tasks 500 before others, etc., but certain rules must be followed:

The Scheduler 312, at the time it decomposes Tasks 905, knows the dependencies that it creates between Tasks 940 as it creates new Tasks 940 from other Tasks 905. It records and respects these dependencies, and will not choose to start or assign a Task 500 whose dependencies have not been fulfilled (Tasks 500 on which the Task 500 depends must have completed—this means that no Tasks 500 on which it depends still reside in the Task Pool 310 or are in progress on one of the Job Loops 318). The Task 500 dependencies, for any Task 500, are simply a list of other Tasks 500 that the Task 500 is dependent on. Dependency lists may be associated with the Task 500, or may be kept in a table, indexed by a Task 500 number, or may be kept by the Scheduler 312 in some other way.

A Task 500 is either in the Task Pool 310 unassigned, or assigned to one (1) Job Loop 318. It cannot be assigned to two or more Job Loops 318, and it cannot both be assigned and waiting to be assigned. Once assigned, it will stay with the Job Loop 318 until it is completed, at which time it ceases to exist.

A Task 500 'A' is understood to be completed when the Main Program asks the Scheduler 312 for a new Task 500 for the Job Loop 318 which was assigned the Task 500 'A'. When a Task 500 is completed, the Scheduler 312 updates (removes) dependencies (Task 500 indicators on a list of Tasks 500 that a Task 500 is waiting on) from Tasks 500 dependent on the completed Task 500.

With these provisos, many implementations are possible. The following step by step description details the operation of one implementation of the Scheduler 312.

Scheduler Routine:

Step 1. The Main Program has asked the Scheduler 312 for a Task 500 for a specific Job Loop 318. If the Job Loop 318 was not previously assigned a Task 500, go to step 3.

Step 2. Because the Job Loop 318 has now requested a Job 320 from the Main Program, and the Main Program has asked the Scheduler 312 for a Task 500 for the Job Loop 318, this means that the Job Loop 318 has now completed any Task 500 previously assigned to it. Look through the Task Pool 310 and for each Task 500, update the lists of other Tasks 500 that they are dependent on, by removing the Task 500 that this Job Loop 318 has just completed, from those lists.

Step 3. Choose a Task 500. The choice of Task 500 can be according to any number of policies, but must be a Task 500 with no outstanding dependencies on other Tasks 500. This Task 500 may be a Task 500 that the Scheduler 312 can decompose, or it may not be. The Scheduler 312 understands which Commands 510 and Operations 610 allow decomposition by different means. The Scheduler 312 may also make decisions to decompose Tasks 500 or not based on available CPU resources, or the number of Job Loops 318 currently occupied with Tasks 500. If the chosen Task 500 is not to be decomposed, go to step 5.

Step 4. Decompose the Task 905 by one of the three means described above—By-Function 920, By-Domain 925, or By-Component 930. Place all of the new Tasks 940 in the Task Pool 310. Go to step 3. Note that Tasks 905 should not be infinitely decomposable, there should be a finite number of data By-Domain 925 partitions possible, and a finite number of Operations 610 and sub-Operations 610. Tasks 905 should not be decomposed into the same Task 940, or into chains of Task 905 decompositions that eventually lead back to the original Task 905, or the Scheduler 312 may get stuck in this loop—but this is an implementation detail, part of the policies and strategies chosen, and definition of Commands 510 and Operations 610, made by the implementor when applying the Parallel Task Engine to a specific problem.

5. Assign the Task 500 to a Job Loop 318, and record this fact. Return a POINTER to the Task 500 to the Main Program.

It is worth noting the extent to which the Scheduler 312 may decompose a particular problem with little knowledge of it, an almost 'blind' or automatic decomposition. The Scheduler 312 need only know which Operations 610 are composed of which other Operations 610 in sequence, to perform a By-Function 920 decomposition, with dependencies among the new Tasks 940 set so that the new Operations 610 are performed in order on the same Primary Data 306. By-Domain 925 decomposition can be done on any Task 905 by adjusting Data Pointers 520 or the Parameters 620 for an Operation 610. And By-Component 930, or interleaved By-Domain 925 decomposition can be done by knowing only which specific partial-datum component or alternate datum Operations 610 to substitute for the full-datum Operation 610. The Code Generator 314, as noted above, may or may not have 'canned' (Locate Static Code 830) specific Operation 610 routines, and it may have to Synthesize 820 new routines. Or it may Optimize 840 a more generic routine to get the appropriate partial datum routine. This general process, especially with code specialized and optimized under specific CONTEXTS, would seem to know more about a problem than it does—in reality it only need know Operation 610 rewriting rules.

But given a multiplicity of possible decompositions, applied blindly without knowledge of a problem, how could such a problem-agnostic Scheduler 312 choose a good decomposition ? It is possible for the Scheduler 312 to have general heuristics, along with a trial and error, run-time experimental approach. Nothing prevents the Scheduler 312 from trying a decomposition, measuring the code in the Operation 610 routines received from the Code Generator 314, and then deciding whether or not to try something different. Or, these experiments can be done ahead of time, and fed back into the heuristics or fixed strategies built-in to the Scheduler. In short, it is possible to build both accumulated experience and run-time decision-making into the Scheduler 312 so that it can make good decompositions, on the basis of the code that will be executed in the scenario under consideration. Novel decomposition strategies, and the availability of a CONTEXT-sensitive dynamic code generator, open up possibilities for dynamic problem decomposition, and as well as dynamic code generation, in order to get the most efficient Tasks 500 under prevailing conditions.

More specifically, the Scheduler 312 can make run-time decomposition choices based on the quality of code generated by the Code Generator 314, in the Main Program procedures as described above, with no change necessary to those procedures. Generated code quality is simply another input to the Scheduler's 312 decomposition strategy. When presented with a Task 905 to be decomposed, the Scheduler 312 can try a number of Operation 610 re-writings in terms of new Operations 610. It can request (independently of the Main Program's call to the Code Generator 314) the Code Generator 314 to generate code for the Operations 610 considered. The Code Generator may return statistics to the Scheduler 312, or the Scheduler 312 may analyze the code itself. Operation 610 routines will be created differently by the Code Generator 314 at different times, depending on the CONTEXT, and the Scheduler 312 will make different decomposition decisions accordingly. The Scheduler 312 uses the Code Generator 314 in order to effect 'dynamic problem decomposition'.

Example Applications: The following applications demonstrate the use of the Parallel Task Engine design and scheme of computation to provide solutions to specific computational problems, using dynamic code generation, in a multi-CPU environment.

Application 1: Matrix-Vector Multiplication: A matrix K, with M rows and N columns, may be multiplied by a column vector V, with N rows, to get a column vector P, with N rows. Element "I" of P is the vector dot product of row I of matrix K with the vector V. Or, assuming rows are numbered 0 to M−1 and columns 0 to N−1:

$$P[I] = \underset{J=0}{\overset{N-1}{SUM}} K[I][J] * V[J]$$

Matrix-vector multiplication of this sort comprises a linear transformation of the vector V by the function represented by the matrix K, and has many applications in various domains of computation.

FIG. 10 shows a routine, written in Intel x86 assembly language, using the SSE3 instruction set extensions, which loops through vector data, multiplying these vectors by a constant matrix, and creating an output set of vectors. The semantics of the individual Intel x86 instructions are defined in the *Intel Architecture Software Developer's Manual*. This routine computes the multiplication of a 4×4 matrix with a 4×1 (4 row, 1 column) vector. All matrix and vector elements are double precision (64 bit) IEEE 754 format floating point numbers. The loop body computes two row-vector dot products at a time, using the HADDPD (Horizontal ADD Packed Double-precision) instruction and then does the next two. It is limited in the amount of computation it can accomplish before loading more data from memory, because the Intel x86 architecture only provides eight registers for vector data, which may be operated on with the SSE3 instructions. This routine is a reasonably efficient implementation, although greater efficiencies may be achieved by unrolling the loop, and reordering (scheduling) the instruction sequence to allow the processor to execute the instruction stream more quickly.

A Parallel Task Engine software system can be constructed to perform matrix-vector multiplication, starting from the program in FIG. 10 as the template for a generic Operation 610 routine.

Define the following Commands 510/Operations 610/Tasks 302: Operation 610 MATVEC4×4—Multiply a 4×4 matrix by a 4×1 vector, for all the vectors in an input array, computing product vectors, which are stored in an output array (as in the routine in FIG. 10). A Command 510 specifying this Operation 610 is Parameterized 620 by the number of vectors to process, the offset in bytes from the beginning of the array of the first input vector and first output vector to process, and an offset mask, which is the ((number of vectors to process multiplied by the vector size in bytes)-1). Data Pointers 520 are provided in the enclosing Task 500 to specify the base addresses of the input and output vector arrays.

Operation 610 XY_MATVEC4×4, and Operation 610 YZ_MATVEC4×4These Operations 610 are sub-Operations 610 of MATVEC4×4, and Tasks 905 with MATVEC4X4 Operations 610 may be decomposed into one Task 940 each with XY_MATVEC4X4 and YZ_MATVEC4X4 Operations 610. These Operations 610 compute (only) either the x and y (0 and 1), or y and z (2 and 3) elements of the four element product vector, in the matrix-vector multiply of the MATVEC4×4 Operation 610. A Command 510 specifying either of these Operations 610 is Parameterized 620 by the number of vectors to process in this Task 500, the starting offset of vectors input and output in this Task 500, and the offset mask from the full-datum Task 500 from which it was decomposed. The Data Pointers 520 are copied from the full-datum Task 500 into these half-datum sub-Tasks 500.

The machine receives MATVEC4X4 Tasks 302 (Tasks 302 with Commands 510 with Operation 610 of MATVEC4×4) from the outside world, and processes them; that is its sole function. It decomposes and dispatches these Tasks 302 or sub-Tasks 500 as it deems necessary in a one, two, or four CPU environment. The matrix used for the matrix-vector multiplication is part of the CONTEXT.

The Scheduler 312 for this matrix-vector multiplying machine has the following policies:

First-in, First-out (FIFO), or "first come, first served". As Tasks 302 are received at the Task input 303, they are placed in the Task Pool 310 in a linked list, such that new Tasks 500 are placed at the end of the list. Tasks 500 are assigned to Job Loops 318 (after being decomposed, if the Scheduler 312 chooses to do so) from the front of the list.

If there is only one CPU present, the Scheduler 312 will not decompose MATVEC4X4 Tasks 500. If there are two CPUs present, the Scheduler 312 will decompose MATVEC4X4 Tasks 905 By-Component 930 to get XY_MATVEC4X4 and YZ_MATVEC4X4 Tasks 940 (Tasks 940 with Commands 510 with Operations 610 which are XY_MATVEC4X4 and YZ_MATVEC4X4). These two sub-Tasks 940 each process all the vectors, but start at different points in the arrays—the XY sub-Task 500 will start at the beginning and the YZ sub-Task 500 will start at the middle of the input and output arrays. If there are four CPUs present, XY_MATVEC4X4 and YZ_MATVEC4X4 Tasks 905 are further decomposed By-Domain 925, splitting the XY Task 905 into two XY sub-Tasks 940, and the YZ Task 905 into two YZ sub-Tasks 940, each responsible for half of the vectors covered by the larger Task 500 from which it was decomposed. A MATVEC4X4 Task 302 becomes 1, 2, or 4 Tasks 500, for 1, 2, or 4 CPUs.

Decomposed Tasks 940 replace the original Task 905 in the same position on the linked list of Tasks 500 in the Task Pool 310—in other words, one MATVEC4X4 Task 500 in the second position from the head of the linked list can become XY_MATVEC4X4 and YZ_MATVEC4X4 Tasks 500 in positions 2 and 3, in front of the Task 500 that was previously at position 3.

There are no dependencies between any Tasks 500 or sub-Tasks 500 in this MATVEC4x4 engine.

These policies applied to the step-by-step description of the general Scheduler 312 procedure given above characterize the specific Scheduler 312 for the MATVEC4X4 engine.

The Code Generator 314 for this MATVEC4X4 engine operates as follows:

The MATVEC4X4 Operation 810 routine is as shown in FIG. 10. It can be used unchanged for a MATVEC4X4 operation.

The XY_MATVEC4X4 Operation 810 routine is shown in FIG. 11. It can be used directly, or it could also be derived from the MATVEC4X4 routine by applying the Optimizer 840—note that when the z and w components are considered dead, all of the instructions that contribute to the computation of these values (the last 12 instructions in the second half of the loop body) can be eliminated. Once these instructions are eliminated, the four matrix-row register loads in the second half of the loop body become redundant, and the first four loads of these values to registers, which are now constant over the loop, can be moved outside the loop. The YZ_MATVEC4X4 Operation 810 routine is symmetrical to the XY routine, and is of the same length.

The XY_MATVEC4X4 and YZ_MATVEC4X4 Operation 810 routines can be specialized by knowledge of the constant matrix, in the CONTEXT, that is used over the routine. Of course, when the CONTEXT changes, Operation 610 routine look-ups in the Cache 326 Directory 710 will fail, and new Operation 610 routines must be generated, and new Entries 720 created. In this example engine, the Code Generator 314 will take note of which matrix elements are zero and nonzero. FIG. 12 shows a routine that has been specialized with such knowledge of matrix zero elements. It can be derived from XY and YZ routines as shown in FIG. 11, by using the Optimizer 840 to systematically apply simple substitutions and rules, as noted in the comments accompanying the code.

FIG. 13 shows an extremely optimized version of the XY_MATVEC4X4 Operation 810 routine, specialized with the same matrix knowledge as in FIG. 12. Achieving this code is challenging, but possible for an Optimizer 840. It represents a dramatic example of the possible performance advantage of specialized, optimized, decomposed Operation 810 routines.

The MATVEC4X4 engine will basically operate as follows:

MATVEC4X4 Tasks 302 will arrive at the Task input 303.

The engine will dispatch the Tasks 500 to the Job Loops 318 in order.

1, 2, or 4 Job Loops 318 will execute either:

1 CPU/Job Loop 318: 1 MATVEC4X4 Operation 610 routine per incoming MATVEC4X4 Task 302.

2 CPUs/Job Loops 318: 1 XY_MATVEC4X4 Operation 610 and 1 YZ_MATVEC4X4 Operation 610 per incoming MATVEC4X4 Task 302.

4 CPUs/Job Loops 318: 2 XY_MATVEC4X4 Tasks 500, and 2 YZ_MATVEC4X4 Tasks 500, each XY or YZ Task 500 operating on half of the vectors, for each MATVEC4X4 Task 302.

Performance of the MATVEC4X4 Parallel Task Engine: In the case of 1 CPU/Job Loop 318, the performance of a Parallel Task Engine implementation of MATVEC4X4 Operations 610 on arrays of vector data is substantially the same as simply calling the Operation 610 routine directly—there is a very small amount of overhead for SCHEDULING and communication, but the processing of the Primary Data 306 is unchanged.

Looking at FIG. 10 more closely, we see that this processing consists of 32 instructions, 12 memory reads, and 2 memory writes, in the body of the loop, in order to compute one complete product vector. The instructions ahead of the loop and at the very end of the loop, which update offsets and loop count, are not counted. The instructions ahead of the loop are not counted because they are executed once per routine, and with a large number of vectors to be processed, the time spent in the loop will represent almost all the time spent in the routine. The reason the instructions at the end of the loop should not be counted is that this loop may easily be 'unrolled' that is, the body of the loop may be duplicated some number of times, and the offset and loop count updates may be amortized over the entire resulting loop body. For clarity and brevity, none of the code examples are unrolled, but they all may be, and so the metrics for comparison include the length in instructions of the core loop body, and the quantity of results achieved by that code. It is also possible, for any particular CPU and computer system, to estimate or measure the actual time in CPU clock cycles for a small 'kernel' computation such as this, but the cycle counts for instructions on different models of CPU vary. For any one CPU, however, given a base routine using particular instruction set features, routines with shorter core sequences will in general be faster. As long as these shorter routines do not use 'extra' CPU features that would have also been useful in the base routine, these are fair comparisons. Lastly, the code in these Operation 610 routines can be re-ordered, or scheduled, in particular ways for particular CPU models, and this can improve the performance of this code on a particular CPU. Instructions can have various latencies (time to creation of results), but another instruction may start execution before a previous instruction has completed, as long as the later instruction does not require the results of the previous instruction. So instruction execution may be overlapped, and instructions can be re-ordered to take advantage of this overlap. Instructions may only be re-ordered insofar as long as they preserve the semantics of the original sequence—in other words, data dependencies and the essential computations must remain the same in the re-scheduled code. The fewer data dependencies, and the more independent computations, or the more computations that may remain independent because there are free registers to hold their intermediate results, the more freedom a scheduler has in re-ordering instructions. None of the examples have been optimally scheduled for any particular CPU, but arguments will be made that some of the examples are more amenable to scheduling than others.

In the case of two or four CPUs, XY_MATVEC4X4 and YZ_MATVEC4X4 Operations 610, as in FIG. 11, will be used. The core of the loop is 12 instructions, with two memory reads, and 1 memory write. Because it is only computing the x and y components of the output vector, only the first two rows of the matrix are required, and the four registers containing the first two rows may be loaded ahead of, and remain constant throughout, the loop. In 12 instructions two of the four components of the output vector are computed. The YZ Operation 610 routine is symmetrical, and performs the same intrinsic computations. This scheme of computing two components at a time results in a more efficient loop body. However, in most cases, it would not be a good problem organization on a single CPU, because this would mean traversing the input and output arrays twice for the same computation, doubling the total number of memory reads and writes, and this would likely overwhelm the 25% (12 for XY+12 for YZ=24, compared to 32) reduction in the length of the loop body. With a large array of vectors, the required reads and writes to input and output vector arrays will outstrip the single CPU's data cache capacity, and some number of cache misses will occur. Double the cache misses will occur if XY and YZ routines are executed in sequence on a single CPU, unless the original MATVEC4X4 Task 302 was first decomposed By-Domain 925 into a series of small vector batches (which could be done without the Parallel Task Engine, by simply nesting an XY loop and a YZ loop in an outer loop, or could also use a Parallel Task Engine configured for this application, to do the decomposition, even with one CPU). However, even in this case, any single CPU has a limited size data cache, and two CPUs of the same model will have twice the data cache, and this can be exploited. An XY and a YZ Task 500 can be dispatched to different CPUs, and in this case, each CPU will see roughly the same number of cache misses as a single CPU running the full-datum routine of FIG. 10 (or less, because the matrix rows are not reloaded), but enjoy the 25% reduction in loop body length, and the factor of three reduction in memory reads. Each XY or YZ loop does half as much work, but it is more than twice as fast, and so using two CPUs in this fashion is faster than using two CPUs and decomposing a MATVEC4X4 Task 905 simply By-Domain 925, giving half the full-datum computations to each processor (which, of course, can be done with the Parallel Task Engine). An advantage of this two-processor XY, YZ decomposition, over one in which (a series of smaller) XY and YZ routines are performed in sequence on a single CPU, which would then be decomposed By-Domain 925 to two sets of Tasks 940 for 2 CPUs, is that there are fewer Tasks 940 (the same number of Tasks 940 for all models of CPU, no matter what the data cache capacity), and the Scheduler 312 does not have to estimate the appropriate working set to avoid data cache thrashing on any single CPU—the two CPU data caches are used to advantage transparently and in a way that works on any model of CPU. It is true that in total, under a By-Component 930 decomposition, the number of input data reads done by the CPUs in combination, may be more than the number of reads done by full-datum routines on the same number of CPUs (although this is not the case in the current example, due to the dearth of registers, and the requirement to reload the input vectors, in the full-datum routine), and this may be how we "pay" for the extra registers available in partial-datum routines—but those reads are covered by the individual data caches on the CPUs, and the fact that the total load on memory is higher will not be important, unless the two CPUs contend for access to memory.

To keep the two CPUs from contending for access to the same memory at the same time, the XY Task 500 starts at the beginning of the input and output arrays, and YZ Task 500 starts in the middle. As the input and output offsets are advanced through the arrays in each routine, they are masked (logical "and" operation) with the offset mask as defined above, which has the effect of "wrapping" the offset around at the end of the vector arrays—the XY Task 500 starts at vector 0 and ends at vector N−1, and the YZ Task 500 starts at N/2, wraps past the end to 0, and ends at vector N/2-1. Thus, if the two Operations 610 proceed at roughly the same rate, they will rarely contend for read access to the same memory. They will of course, not ever write the exact same memory, as one Task 500 will write only x and y, and the other will write only y and z, but they could possibly at times contend for write access to the same local area of memory, as they can when reading—logically, if both are started at the same time, and are running at the same speed, they will not contend, but because they are independent, unsynchronized CPUs, with independent asynchronous events and independent resource management, they may drift forward and backward with respect to each other, and very occasionally need access to the same memory. Since their starting and ending locations are N/2 vectors apart, minor variations in moment to moment progress should make instances of access to the same vector, or even the same large group of vectors, very rare. (This same multi-CPU, multi-cache, non-contending access scheme can be used in any scenario of decomposition By-Domain 925 in which the two domains are interleaved, and would require multiple passes through the data on a single CPU, deriving the same benefit of allowing separate computation on interleaved sets of data with no memory access penalty.)

With two or more CPUs, the XY and YZ problem breakdown takes advantage of having two sets of registers and two data caches to apply to the problem.

In the case of four CPUs, the XY and YZ Tasks 905 can be decomposed by Domain 925, each Task 905 splitting into two of the same sorts of Tasks 940, with each responsible for one half the vectors. This will cut the time per vector in half. Each Task 940 will now be starting on a separate quarter of the vector arrays, with each task reading and writing half of them, as follows: CPU 0; XY Task 500, vectors 0 to N/2−1, CPU 1: YZ Task 500, vectors N/4 to 3N/4−5 CPU 2: XY Task 500, vectors N/2 to N−1, CPU 3: YZ Task 500, vectors 3N/4 to N/4−1.

When the XY or YZ routines of FIG. 11 are specialized to account for the knowledge of the matrix, they can be even more efficient. FIG. 12 shows that in a case where only one element in each of the two matrix rows being used are non-zero, and the two elements are diagonally adjacent (not that uncommon a case in many matrix applications), a routine specialized through simple optimization can be almost twice as fast as the un-specialized routine, needing only seven instructions in the loop body to complete its work. (Larger, full-datum routines can also be specialized, of course—but the smaller the generic routine, the smaller the resulting specialized routine).

FIG. 13 shows an optimally specialized routine, under the same conditions as in FIG. 12. This result is achievable by a Code Generator 314 and an Optimizer 840, but not as easily as the routine in FIG. 12. This routine requires just three instructions in the core of the loop. Such a short loop suggests a pipelined stream of instructions, one that could be scheduled to achieve maximum overlap of long-latency instructions, as in FIG. 14. The total number of instructions per half-vector output does not change from FIG. 13, but as four half-vectors are "in flight" at the same time (which is possible because of the freeing of registers due to the By-Component 930 decomposition and the constant matrix specialization), this code will probably schedule better on many CPUs.

To summarize the performance of a MATVEC4X4 Parallel Task Engine, we can see from this example, that given what we take as an efficient routine for computing a 4×4 matrix-vector product, i.e. FIG. 10, using By-Component 930 decomposition, with two or four CPUs, we can generate vector products roughly 4/3 as fast (loop body length ratio of 12/16) as any ordinary By-Domain 925 decomposition to multiple CPUs, with no extraordinary effort. When routines are dynamically generated with specialized knowledge of matrix contents, they can be faster (16/7 as fast, loop body length ratio of 7/16, in this example), again without extraordinary effort. With a very advanced Optimizer 840 the performance of specialized code can be even better (16/3 faster, in this example).

By-Component 930 or other By-Function 920 decompositions are useful when the full-datum or full-function routine is "too big" to fit in the register set of the CPU. By-Domain 925 decompositions are generally productive, and in a multi-CPU environment, domains may also be interleaved. As shown by this example, several aspects of the Parallel Task Engine 300 can leverage each other to provide greater than linear speed-up when applying multiple CPUs to the data processing problem:

The availability of multiple CPUs with multiple data caches makes certain problem decompositions practical, which would not be practical in a single-CPU environment. This is true for By-Component 930 and any other interleaved By-Domain 925 decompositions.

By-Domain 925 interleaved decompositions may contain address arithmetic or other expressions which can be simplified in more specific variants of Operation 810 routines, because of knowledge of even-ness, odd-ness, or other implicit numeric properties of data indices under the interleaved decomposition.

The appropriate By-Component 930 or By-Function 920 problem decomposition can yield Operation 610 routines that are simpler and faster, splitting the computation of results over multiple CPU register sets. These routines can then make better use of individual CPU resources, which may allow more data to be computed per iteration, and which may schedule better, leading to better overall efficiency per CPU. They are also easier for a static or dynamic Optimizer 840 to improve.

By-Component 930 and other By-Function 920 decomposed routines can be created dynamically ('algorithmically decomposed') by the Code Generator 314, deriving them from generic routines by applying the Optimizer 840 to the generic code.

Specialization of Operation 810 routines with knowledge of run-time constants can lead to great improvements in processing speed. The presence of a dynamic Code Generator 314 and an Optimizer 840 that can derive specialized routines from generic routines is a general solution to the specialization problem. Small, simple routines, obtained from better decompositions, are also easier to specialize.

Decompositions are chosen, either at run-time, or by experimentation, the results of which are then fed back into the configuration of the Scheduler 312, so that the decompositions produce the best sum total performance, based on an examination of the operation routines generated. The example just given is a methodical exercise in this decomposition process. When the Scheduler 312 makes these decisions at run-time, it must perform a similar analysis of code, weighing the benefits of different decompositions, optimizations, and specializations. Decomposing to get the same amount of work done across all CPUs, with best per-CPU code in dynamically generated Operation 810 routines, is a novel decomposition strategy, and a means for pursuit of this strategy as presented here, is a feature of the invention.

Application 2: 3D Graphic Image Renderer. A 3D graphics image renderer, like the pipeline 200 represented in FIG. 2, can be implemented with the Parallel Task Engine 300. It consists of: Vertex processing (position transformations and lighting); Primitive assembly or "setup", clipping, culling, and rasterization; and Fragment or pixel "shading" (coloring, texturing, buffer operations).

Each of these stages of computation can be performed by a dynamically generated Operation 810 routine that is specialized according to run-time values of graphics CONTEXT variables. The processing involved in the graphic pipeline is ripe for parallel decomposition—many primitives, defined by many vertices, enclosing many pixels, all of these stages have many processing steps, and all of these basic data types have many independent properties.

This graphics pipeline can also support application-provided vertex programs and pixel shaders. These programs are simply part of the graphics CONTEXT, and the Code Generator 314 now creates vertex, setup, and pixel Operation 810 routines using these programs as a source of semantics, instead of the usual fixed function definitions. The result is the same, Operation 610 routines for the three stages specific to the CONTEXT.

These computations at the three stages require large amounts of temporary state, such as buffers and data structures that represent the initial conditions or intermediate results of the computation as it progresses. For example, vertex processing may keep a cache of already-processed vertices, as vertices may be shared by contiguous primitives. For this reason, it is convenient to have stages perform their computations 'at', or conjunction with stage Units 1510. Units 1510 are static data structures enclosing temporary data, utilized by the stage computations, and specific to a particular kind of stage (vertex, setup, or pixel) computation. Stage computations must be attached to an available (no other computation in progress) Unit 1510 of the right kind in order to commence.

Figure 15:
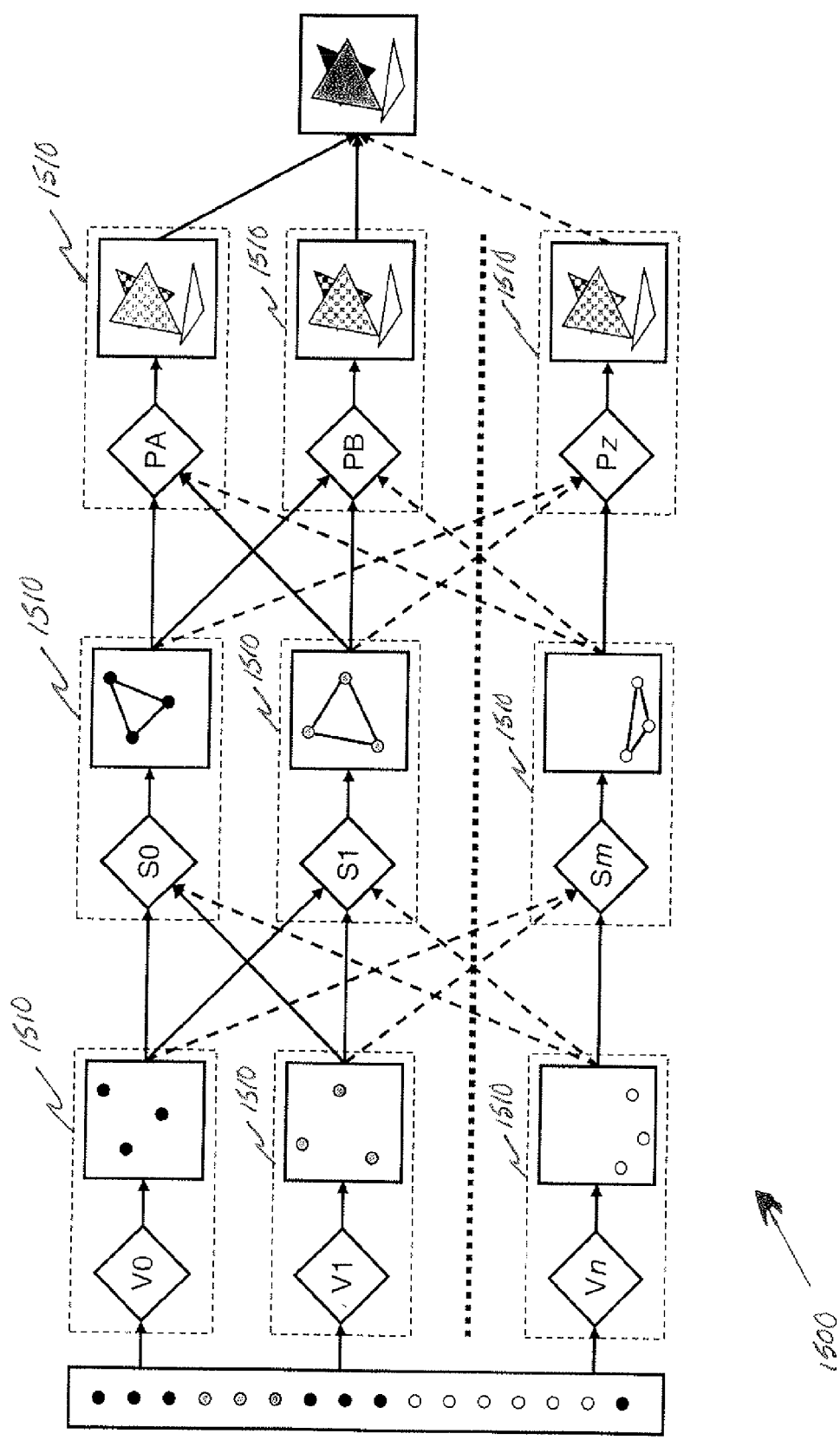
FIG. 15 is a representation of a graphics pipeline consisting of multiple tasks being done by multiple programs, utilizing multiple stage units, according to an embodiment.

FIG. 15 shows the data flow and stages of computation in the graphics pipeline. The horizontal rows show vertex, setup, and pixel Units 1510, with all Units 1510 of the same kind in their own column. There is no specific relationship between the rows and Job Loops 318, or any partition of Primary Data 306. The diagram depicts an array of Units 1510, and the paths that the data may follow, as it is transformed. Any Task 500, for any stage of processing, may be attached to any available Unit 1510 of the right kind, and then the Task 500 may be assigned to any Job Loop 318. The system is set up with as many Units 1510 of a certain kind as required to support concurrent stage computations of that kind.

In the Parallel Task Engine implementation of the graphics pipeline, input Tasks 302 specify lists of graphics primitives to be rendered. The input Primary Data 306 is a collection of vertices and primitive definitions. The output Primary Data 306 is the display frame buffer. Auxiliary data such as transformation and projection matrices, texture and light source definitions reside in the graphics CONTEXT.

The Scheduler 312 for this graphics pipeline has these policies:

Primitives are drawn in first-in, first-out order. All pixels of a primitive may not be displayed at once, but for any pixel in the frame buffer, pixels from primitives are written in the same order as the primitives themselves are (requested to be) drawn, e.g. the pixel resulting from the first primitive drawn will be written first, and the pixel from the last primitive drawn will be written last. This will preserve the effect of primitives that are drawn over portions of other primitives.

Pixel Tasks 500 are dependent on setup Tasks 500 that process the outlines, compute gradients for interpolation, and perform the rasterization of the primitives that enclose or bound them. Primitive setup Tasks 500 are dependent on the vertex Tasks 500 that process the vertices that define the primitive.

Pixels are written to the frame buffer as soon as possible, while preserving drawing order as described above. Pixel sub-Tasks 500 are done before their enclosing primitive setup Tasks 500, which are done before their defining vertex Tasks 500, in other words, as soon as the Tasks 500 on which they are dependent have completed. For any set of pixels covered by a pixel Task 500, the pixel Tasks 500 for primitives drawn earlier are done before the pixel Tasks 500 for that same set of pixels resulting from primitives drawn later. The same ordering with respect to their source primitives is true for setup and vertex Tasks 500.

Tasks 500 must be assigned to a Unit 1510 of the right kind to do their work. If the right kind of Unit 1510 is not available (free) for use, the Task 500 cannot be scheduled. When a Task 500 is assigned a Unit 1510, the Unit 1510 is unavailable until the Task 500 is complete.

Tasks 500 are decomposed in several ways:

The input Task 302 is a list of primitives to render. This input Task 905 is first split into Tasks 940 for two passes. These two passes are a decomposition By-Component 930 of the final frame buffer pixels—the first pass computes only the z-buffer value of the rendered pixels. The second pass computes everything but the z-buffer value, and uses the first pass z-buffer value in the traditional way, in order to determine whether the pixel should be drawn or not.

A (pass 1 or pass 2) primitive-list rendering Task 905 can be decomposed By-Domain 925 into Tasks 940 with shorter lists, or batches of one or more primitives to render.

Figure 2:
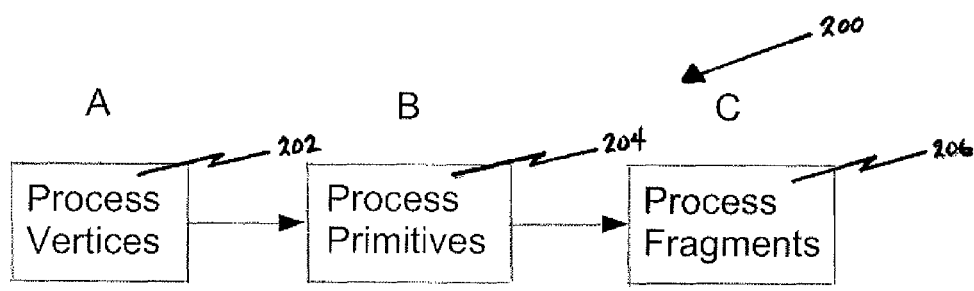
FIG. 2 is a flow diagram depicting another, simpler graphics pipeline organization according to the prior art.

A primitive-list rendering Task 905 is decomposed by FUNCTION into a vertex Task 940, a primitive assembly or setup Task 940, and a pixel Task 940, modeling the pipelines 200 of FIGS. 2 and 1500 of FIG. 15. These Tasks 940 are successive stages, the pixel Task 940 is dependent on the setup Task 940, and the setup Task 940 is dependent on the vertex Task 940.

The vertex Task 500 has a Data Pointer 520 from the input Task 302 to a vertex buffer containing all of the vertices for all of the primitives, to be processed en masse, regardless of their primitive associations. This vertex Task 905 can be decomposed By-Domain 925 into multiple independent vertex Tasks 940. This decomposition may be 'blind', or it could be sorted according to association with groups of primitives.

Vertex processing includes many cases of matrix-vector multiplication, which may be decomposed By-Component 930 and By-Domain 925, as in the matrix-vector example described above.

The primitive setup Task 905 has a Data Pointer 520 to a list of primitives to render, from the input Task 302. It can be subdivided By-Domain 925 into multiple independent Tasks 940 with shorter lists of primitives. Depending on how the original vertex Task 905 was decomposed, some setup sub-Tasks 940 may not be dependent on all of the vertex sub-Tasks 940.

The pixel Task 905 can be decomposed By-Domain 925 into pixel groups of various kinds. One alternative is multiple sections of the display screen. Another is interlaced, or alternating horizontal bands on the display, one or more pixels tall. Or the pixel Tasks 940 can be sorted according to primitive groups, or types. The pixel Tasks 905 may also amenable to By-Component 930 decompositions, e.g. color values, the components of which can be computed independently, in certain lighting and shading operations.

In order to effect its Task 500 ordering policy, the scheduler must look for the earliest pixel Task 500 (from the earliest primitive), check its dependencies, and if none are ready, look for the earliest setup Task 500, and if none are ready, choose the earliest vertex task. This can be done in a number of ways. One convenient way is to keep the Tasks 500 on a linked list, as in the matrix-vector example above. When decomposing primitive-list rendering Tasks 905 into vertex, setup, and pixel Tasks 940, they are added to the list in reverse order: pixel, setup, vertex. Now the scheduler can start from the head of the list, and simply choose the first Task 500 with no outstanding dependencies, and for which a Unit 1510 of the right kind is available.

The Code Generator 314 for the graphics pipeline can take advantage of the following opportunities for specialization and optimization:

The first pass and second pass are By-Component 930 final pixel decompositions of the pixel's depth, z, and the complementary components to z. The first pass Operation 610 routines can be dramatically reduced, as most of the results which will be computed in pass 2 Tasks 500 are not needed in pass 1.

Because the z-buffer is filled early (before pass 2 starts), as soon as rasterization is complete, it is known for any pixel whether or not the pixel will eventually be written to the frame buffer. No additional processing will be done for pixels that are not displayed. This is a kind of 'depth-sorting' that occurs naturally with this decomposition and this engine.

All of the graphics processing stages depend on many variables, options, and auxiliary data in the graphics CONTEXT. There are hundreds of opportunities to specialize Operation 610 routines by knowledge of variables that are constant at run-time, and therefore many conditional tests and branches in generic Operations 810 will be removed by the Synthesizer 820, Optimizer 840, or by substituting canned routines (Locate Static Code 830) for specific variants of Operations 810. For example, multiplying or dividing by a constant of one means that the multiplication or division can be eliminated.

Vertex processing includes many cases of matrix-vector multiplication, and the optimizations presented in the matrix-vector multiplication example above may be used in vertex processing.

Figure 16:
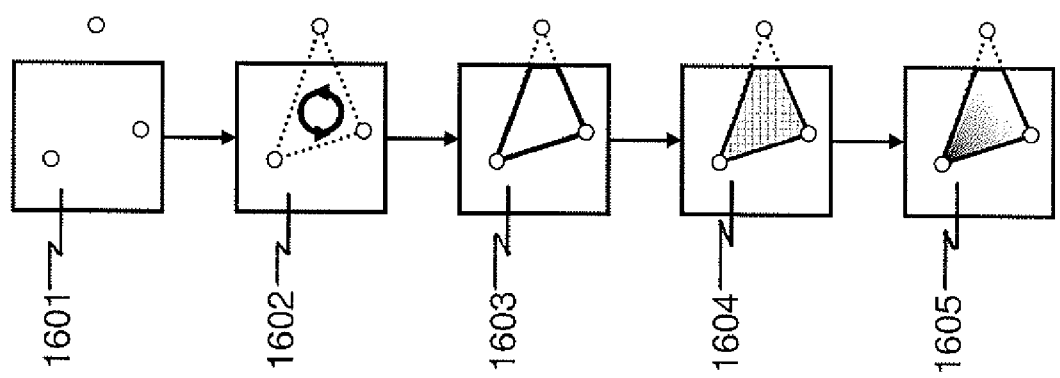
FIG. 16 depicts the sub-stages of the primitive setup stage of the graphics processing pipeline according to an embodiment.

Logical primitive setup stages. Primitive setup can be broken into several stages, as depicted in FIG. 16. Stage 1601 assembles the vertices of the primitive, in the illustration a triangle. Stage 1602 performs back-face culling by determining the winding order of the triangle's vertices. This stage is skipped for line and point primitives. Stage 1603 constructs a polygon covering the primitive's fragments and clips it against the visible region. Stage 1604 projects the clipped polygon into screen space and scan-converts its edges. Stage 1605 computes z and vertex attribute gradients. A detailed description of the operations performed in stages 1603 and 1604 related to rasterization, together called the rasterization stage, follows in the next section.

Figure 17:
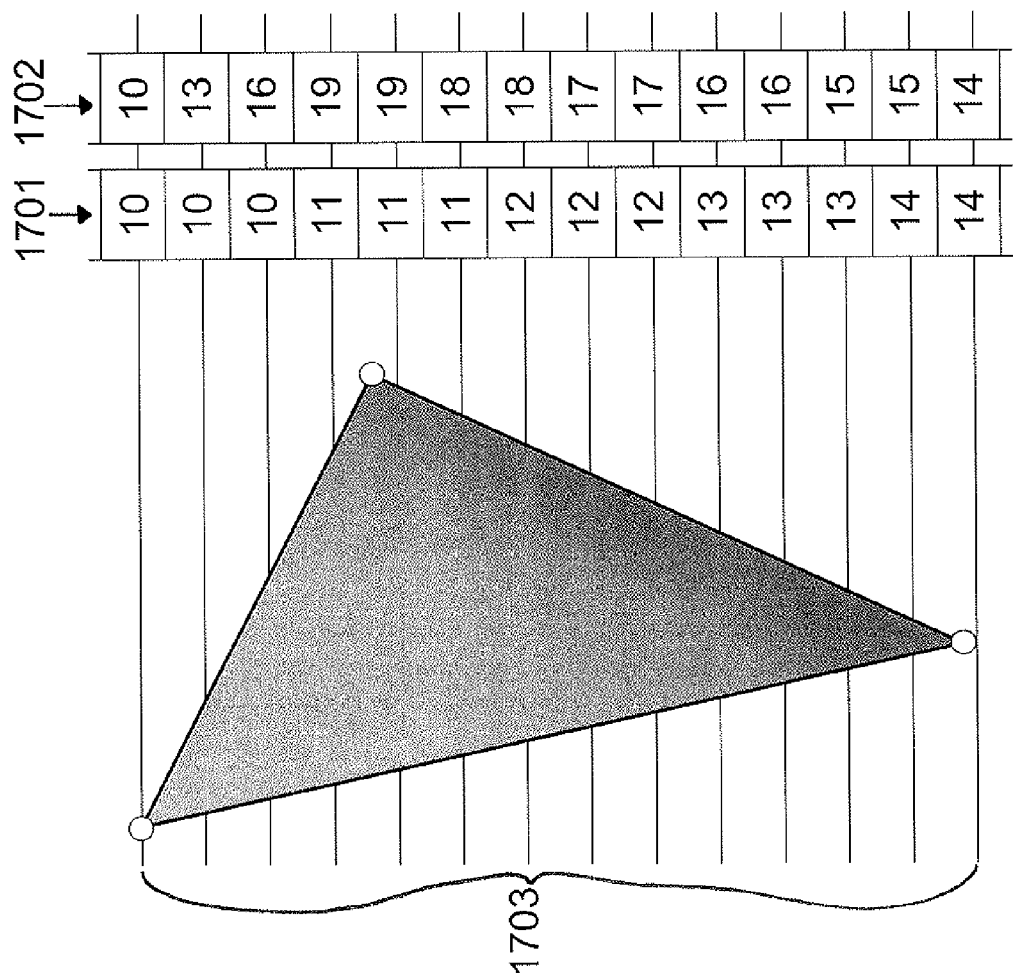
FIG. 17 depicts the convex polygon outline rasterization algorithm according to an embodiment.
Figure 18:
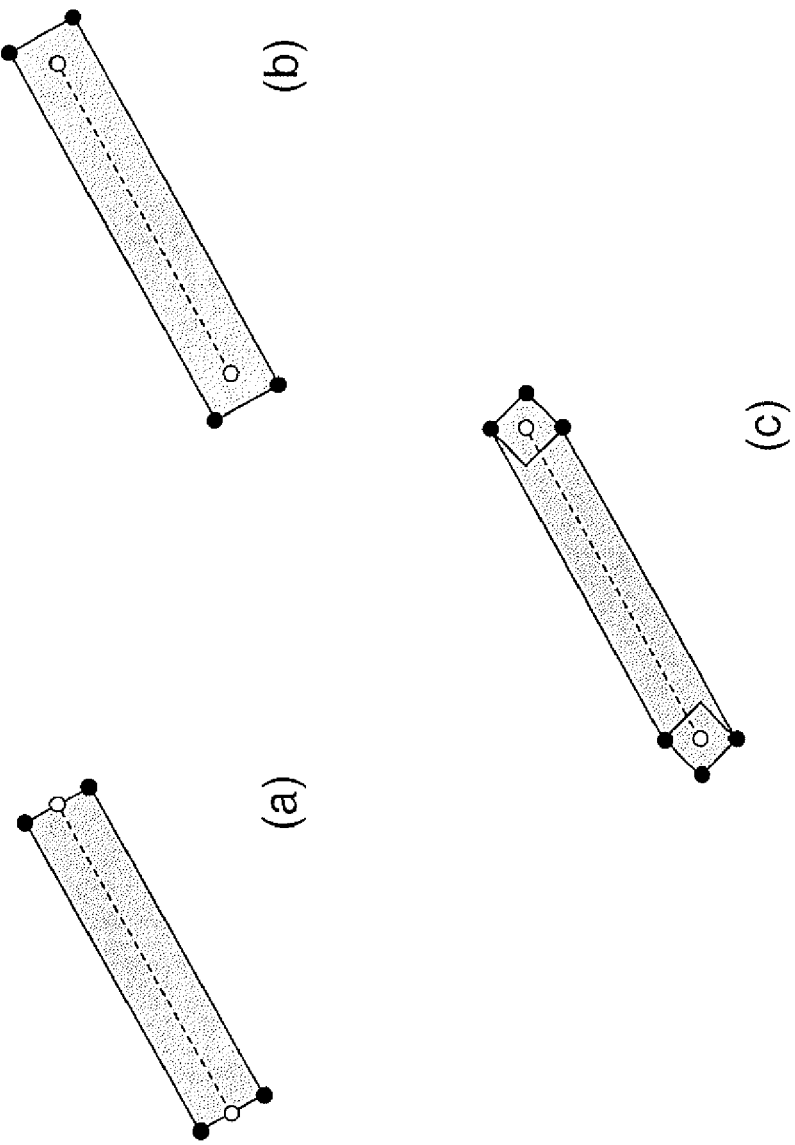
FIG. 18 depicts alternative approaches to construct polygons covering the fragments of line primitives according to an embodiment.

Primitive setup rasterization stage. The first step in rasterizing primitives is to construct a polygon covering their fragments. Triangle primitives can use their vertex positions directly as such a polygon. Line primitives require the construction of a thick line shaped polygon surrounding the line in screen space. One way to achieve this is to construct a 1-pixel wide rectangle as depicted in FIG. 18(*a*) and (b). The white-filled circles connected by the dotted line represent the vertex positions in screen space. The black dots represent the screen space positions of the newly constructed polygon. In FIG. 18(*b*) every polygon edge is located at 0.5 pixel distance from the polygon, to avoid underdraw (missing pixels) in between connecting lines. To comply with the industry-standard 'grid-intersect quantization' (or 'GIQ', described in "The m-Dimensional Grid Point Space", Reinhard Klette, Computer Vision Graphics Image Processing. Vol. 30, pp. 1-12, 1985) rasterization rule using diamonds, two 1-pixel sized diamonds have to be constructed in screen space, centered around the line's vertices, as depicted in FIG. 18(*c*). The six points forming the convex hull of the diamonds are used as the polygon for rasterization. Point primitives require the construction of an axis-aligned square polygon in screen space, centered on the point's position. The second step in rasterization consists of clipping the constructed polygon using the Sutherland-Hodgman clipping algorithm, against viewing frustum planes and optional application-controlled clipping planes. The viewing frustum and viewport scaling can be adjusted to provide viewport and scissor clipping functionality. Only positions are clipped; the constructed polygon does not include vertex attribute data. The next step is to rasterize the outline of the (clipped) polygon, and is illustrated in FIG. 17. For every edge of the polygon (a pair of points), it is determined whether it is on the left or right side of the polygon. For every scanline 1703 intersecting the edge, the x-coordinate of the intersection is computed, and stored in the left outline array 1701 or right outline array 1702 depending on which side the edge is located, at an index corresponding to the scanline's y-coordinate. For anti-aliasing purposes intersections can be computed at higher resolution. The intersections can be computed efficiently using a variant of Bresenham's line drawing algorithm, the 'digital differential analyzer' (DDA) algorithm or a fixed-point or floating-point edge stepping method. Together with the outline arrays the top and bottom index where the polygon is located in the outline arrays 1701 and 1702 is stored. The (clipped) polygon can now be discarded. Gradient setup calculations use the original vertices of the primitive. The outline arrays and top and bottom indices can now be used by the interpolators to determine coverage masks for pixels or groups of pixels: For every fragment the coverage can be determined by comparing it's x-coordinate to the left and right outline arrays at the index corresponding to the fragment's y-coordinate. This process can be done in parallel for a group of fragments. Advantages of the whole rasterization algorithm compared to prior art are the ability to clip every type of primitive to viewport and scissor edges at an early stage, computing fragment coverage at a lower per-fragment cost than using half-space functions (as described in "Triangle Scan Conversion using 2D Homogeneous Coordinates", Marc Olano and Trey Greer, Proceedings of the 1997 SIGGRAPH/Eurographics Workshop on Graphics Hardware), and computing coverage of groups of fragments in parallel on the same processor and in parallel for multiple groups of fragments on multiple processors.

Performance of the Graphics Pipeline. A graphics pipeline implemented via the Parallel Task Engine 300 as described above can keep multiple CPUs busy throughout every stage of image rendering, from the original list of primitives to display, to the final pixel frame buffer operations. This, in concert with the previously described beneficial problem decomposition, and dynamically generated context-specific optimized code, as well as specific, novel graphics processing algorithms detailed above, can give a super-linear acceleration of the rendering process when applied via this engine to multiple CPUs.

While illustrated in the block diagrams as groups of discrete components communicating with each other via distinct data signal connections, it will be understood by those skilled in the art that an embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present description is meant to encompass embodiments including a method, a system, a computer readable medium or an electrical or electro-magnetical signal.

The embodiments described above are intended to be exemplary only. The scope of the description is therefore intended to be limited solely by the scope of the appended claims.

What is claimed is:

1. In a computer system, a parallel task engine for performing tasks on data, the parallel task engine comprising:
   an input for receiving tasks;
   a scheduler for decomposing the tasks into one or more new tasks, the decomposing being dependent on at least one policy selected from a given set of policies;
   a run-time dynamic code generator for generating, for the new tasks, operation routines, the run time dynamic code generator comprising a dynamic compiler, the dynamic compiler being adapted to output the operation routines for execution;
   a set of job loops, at least one of the job loops for performing the new tasks on at least part of the data by executing the operation routines;
   the scheduler for distributing and assigning the new tasks to the at least one of the job loops; and
   the scheduler for making the selection of the at least one policy as a function of characteristics of the operation routines generated by the run-time dynamic code generator.

2. The parallel task engine of claim 1, wherein the run-time dynamic code generator uses a context having a collection of variables, or a pointer to a collection of variables, specifying at least one of options, parameters, conditions, constant data, and other data apart from the data on which tasks are performed, the context for influencing the tasks performed on the data.

3. The parallel task engine of claim 2, wherein the tasks comprise a matrix multiplication of a vector by a matrix, the matrix comprised in the context.

4. The parallel task engine of claim 1, wherein tasks and new tasks comprise:
   a command, comprising:
      a name having a numeric or symbolic identifier, or a pointer to such an identifier, the name defining an abstract operation to be performed on data:
      zero, one, or more parameters; and
      one or more pointers or parameters, identifying the data on which the command is to be performed.

5. The parallel task engine of claim 1, further comprising a cache for retaining and retrieving the operation routines.

6. The parallel task engine of claim 5, wherein the cache comprises a directory of cache entries, each entry comprising:
   an operation routine pointer, and
   a tag to be matched when searching the cache for operation routines, the tag consisting of an operation routine identifier and a context, the context having a collection of variables, or a pointer to a collection of variables.

7. The parallel task engine of claim 1, wherein the run-time dynamic code generator further comprises an optimizer, the optimizer taking as input an operation routine from the operation routines, or a pointer to an operation routine from the operation routines, the optimizer producing as output an output operation routine, or a pointer to the output operation routine, which is semantically equivalent to the input operation routine.

8. The parallel task engine of claim 7, wherein tasks and new tasks comprise a command and wherein the optimizer producing as output an output operation routine, or a pointer to the output operation routine, the output operation routine being equivalent to the input operation routine under the limitations or conditions described by the command.

9. The parallel task engine of claim 7, wherein the run-time dynamic code generator uses a context and wherein the optimizer producing as output an output operation routine, or a pointer to the output operation routine, the output operation routine being equivalent to the input operation routine under the limitations or conditions described by the context.

10. The parallel task engine of claim 1, wherein the decomposing the tasks is performed according to at least one of the following policies:
   a. decomposing a task into one or more new tasks by partitioning the data on which the task is to be performed into one or more subsets of that data, each new task being responsible for performing the same operation as the original task on a corresponding data subset;
   b. decomposing a task into one or more new tasks, each of which performs a different operation than the original task, but which performs this operation on the same data set as the original task; and
   c. decomposing a task into one or more new tasks, by partitioning an individual datum of the data on which the task is to be performed, into sub-components, each new task creating one sub-component of each resulting datum for all the data.

11. The parallel task engine of claim 1, wherein the scheduler is further for estimating, for an operation routine from the operation routines, a performance, the operation routine comprising instruction code, the estimating comprising at least one of analyzing, inspecting and measuring characteristics of the operation routine instruction code.

12. The parallel task engine of claim 11, wherein the scheduler is further for selecting the policy for decomposition which yields the highest estimated performance, based on the estimated performance of operation routines.

13. The parallel task engine of claim 1, wherein the tasks comprise graphics processing tasks for 3D objects defined as a collection of geometric primitives, and further wherein the scheduler is for decomposing the graphics processing tasks into one or more new graphics processing tasks.

14. The parallel task engine of claim 13, wherein the scheduler is further for decomposing the graphics processing tasks into at least one of one or more vertex processing tasks, one or more primitive processing tasks, and one or more pixel processing tasks.

15. The parallel task engine of claim 13, further comprising a rasterization module for identifying pixel fragments covered by the primitives, the rasterization module being configured for:
   assembling the vertices of each of the primitives;
   constructing a polygon covering the fragments:
   scan converting the polygon to obtain coordinates of the scan converted polygon; and
   storing the coordinates in an outline buffer;
   the coordinates being used in the identification of the pixel fragments covered by the primitives.

16. The parallel task engine of claim 15, wherein the rasterization module is further configured for clipping the polygon against the visible region prior to the scan conversion.

17. The parallel task engine of claim 13, wherein the graphics processing tasks comprise pixel processing tasks which draw the 3D objects to a rendered image, wherein the scheduler is further for decomposing the pixel processing tasks into one or more new pixel processing tasks whereby at least two of the new pixel processing tasks contain fragments of non-overlapping regions in the rendered image, and the new pixel processing tasks are assigned to at least two job loops.

18. The parallel task engine of claim 17, wherein the new pixel processing tasks are assigned to a job loop when no other new pixel processing tasks containing overlapping fragments is executing in any of the job loops.

19. The parallel task engine of claim 13, wherein the new graphics processing tasks are assigned to a job loop which previously executed a new graphics processing task which shares part of the data set of the new graphics processing task.

20. In a computer system, a method for performing tasks on data, the method comprising:
   receiving tasks;
   decomposing the tasks into one or more new tasks, the decomposing being dependent on at least one policy selected from a given set of policies;
   generating for the new tasks, operation routines, the generating comprising outputting the operation routines for execution using a dynamic compiler;
   making the selection of the at least one policy as a function of characteristics of the operation routines generated or located by the run-time dynamic code generator;
   providing a set of job loops;
   distributing and assigning the new tasks to at least one of the job loops; and
   the at least one of the job loops performing the new tasks on at least part of the data by executing the operation routines.

21. The method of claim 20, wherein the generating of operation routines uses a context having a collection of variables, or a pointer to a collection of variables, specifying at least one of options, parameters, conditions, constant data, and other data apart from the data on which tasks are performed, the context for influencing the tasks performed on the data.

22. The method of claim 21, wherein the tasks comprise a matrix multiplication of a vector by a matrix, the matrix comprised in the context, 23. The method of claim 20, wherein tasks and new tasks comprise:
   a command, comprising:
      a name having a numeric or symbolic identifier, or a pointer to such an identifier, the name defining an abstract operation to be performed on data;
      zero, one, or more parameters; and
   one or more pointers or parameters, identifying the data on which the command is to be performed.

24. The method of claim 20, further comprising retaining and retrieving the operation routines.

25. The method of claim 20, wherein the run-time dynamic code generator further comprises an optimizer, producing from an input operation routine from the operation routines, or a pointer to an operation routine from the operation routines, an output operation routine, or a pointer to the output operation routine, which is semantically equivalent to the input operation routine.

26. The method of claim 25, wherein tasks and new tasks comprise a command and wherein the production of an output operation routine, or a pointer to the output operation routine, results in an output operation routine which is equivalent to the input operation routine under the limitations or conditions described by the command.

27. The method of claim 25, wherein the generating of operation routines uses a context and wherein the production of an output operation routine, or a pointer to the output operation routine, results in an output operation routine which is equivalent to the input operation routine under the limitations or conditions described by the context.

28. The method of claim 20, wherein the decomposing the tasks is performed according to at least one of the following policies:
   d. decomposing a task into one or more new tasks by partitioning the data on which the task is to he performed into one or more subsets of that data, each new task being responsible for performing the same operation as the original task on a corresponding data subset;
   e. decomposing a task into one or more new tasks, each of which performs a different operation than the original task, but which performs this operation on the same data set as the original task; and
   f. decomposing a task into one or more new tasks, by partitioning an individual datum of the data on which the task is to be performed, into sub-components, each new task creating one sub-component of each resulting datum for all the data.

29. The method of claim 20, further comprising estimating, for an operation routine from the operation routines, a performance the operation routine comprising instruction code, the estimating comprising at least one of analyzing, inspecting and measuring characteristics of the operation routine instruction code.

30. The method of claim 29, further comprising selecting the policy for decomposition which yields the highest estimated performance, based on the estimated performance of operation routines.

31. The method of claim 20, wherein the tasks comprise graphics processing tasks for 3D objects defined as a collection of geometric primitives, and wherein the decomposing comprises decomposing the graphics processing tasks into one or more new graphics processing tasks.

32. The method of claim 31, wherein the decomposing comprises decomposing the graphics processing tasks into at least one of one or more vertex processing tasks, one or more primitive processing tasks, and one or more pixel processing tasks.

33. The method of claim 31, further comprising identifying pixel fragments covered by the primitives, said identifying comprising:
   assembling the vertices of each of the primitives;
   constructing a polygon covering the fragments;
   scan converting the polygon to obtain coordinates of the scan converted polygon; and
   storing the coordinates in an outline buffer;
   the coordinates being used in the identification of the pixel fragments covered by the primitives.

34. The method of claim 33, further comprising clipping the polygon against the visible region prior to the scan conversion.

35. The method of claim 31, further comprising pixel processing tasks which draw the 3D objects to a rendered image, wherein the decomposing comprises decomposing the pixel processing tasks into one or more new pixel processing tasks whereby at least two of the new pixel processing tasks contain fragments of non-overlapping regions in the rendered image, and the new pixel processing tasks are assigned to at least two job loops.

36. The method of claim 35, wherein the new pixel processing tasks are assigned to a job loop when no other new pixel processing tasks containing overlapping fragments is executing in any of the job loops.

37. The method of claim 31, wherein the new graphics processing tasks are assigned to a job loop which previously executed a new graphics processing task which shares part of the data set of the new graphics processing task.

* * * * *